United States Patent [19]

Payne

[11] Patent Number: 4,465,924
[45] Date of Patent: Aug. 14, 1984

[54] PROTECTIVE CONTROL ARRANGEMENT FOR DUTY CYCLE CONTROLLED SHEATHED HEATING ELEMENTS

[75] Inventor: Thomas R. Payne, Louisville, Ky.

[73] Assignee: General Electric Company, Louisville, Ky.

[21] Appl. No.: 337,878

[22] Filed: Jan. 7, 1982

[51] Int. Cl.$^3$ ............................................. H05B 1/02
[52] U.S. Cl. .................................... 219/492; 219/483; 219/508; 361/8; 361/42; 307/134
[58] Field of Search ............................... 219/483–486, 219/494, 492, 493, 497, 508, 322, 481, 482, 507, 509; 361/3, 8, 13, 58, 42, 73, 75; 307/134, 135

[56] References Cited

U.S. PATENT DOCUMENTS

| | | | |
|---|---|---|---|
| 2,094,480 | 9/1937 | Vogel | 201/66 |
| 3,592,771 | 7/1971 | Vedder et al. | 252/63.2 |
| 4,044,224 | 8/1977 | Jenkins et al. | 219/322 |
| 4,054,857 | 10/1977 | Bowling | 337/129 |
| 4,296,449 | 10/1981 | Eichelberger | 361/3 |
| 4,370,692 | 1/1983 | Wellman et al. | 361/109 |

FOREIGN PATENT DOCUMENTS 946623  1/1964  United Kingdom .

*Primary Examiner*—M. H. Paschall
*Attorney, Agent, or Firm*—H. Neil Houser; Radford M. Reams

[57] ABSTRACT

A protective control arrangement for an apparatus incorporating one or more heating units of the type comprising the concentric assembly of a resistive heating element embedded in an insulating material enclosed within a metallic sheath energized in accordance with a duty cycle power control scheme, which prevents the rupture or separation in the sheath caused by an arc at a discontinuity in the heating element from propagating along a substantial portion of the sheath.

In one embodiment, a microprocessor controlled relay associated with each heating element selectively couples and decouples its associated heating element and the power supply. The microprocessor is preprogrammed to control the duty cycle of each heating element by periodically opening the associated relay switch, thereby decoupling the heating element from the power supply for idle periods of predetermined duration. A timer monitors the time between power decouplings. Whenever the time between power decouplings for any heating element exceeds a predetermined maximum time, the microprocessor decouples power from the heating element for a predetermined recovery period. The maximum time is selected so as to confine the propagation time within a predetermined limit.

13 Claims, 20 Drawing Figures

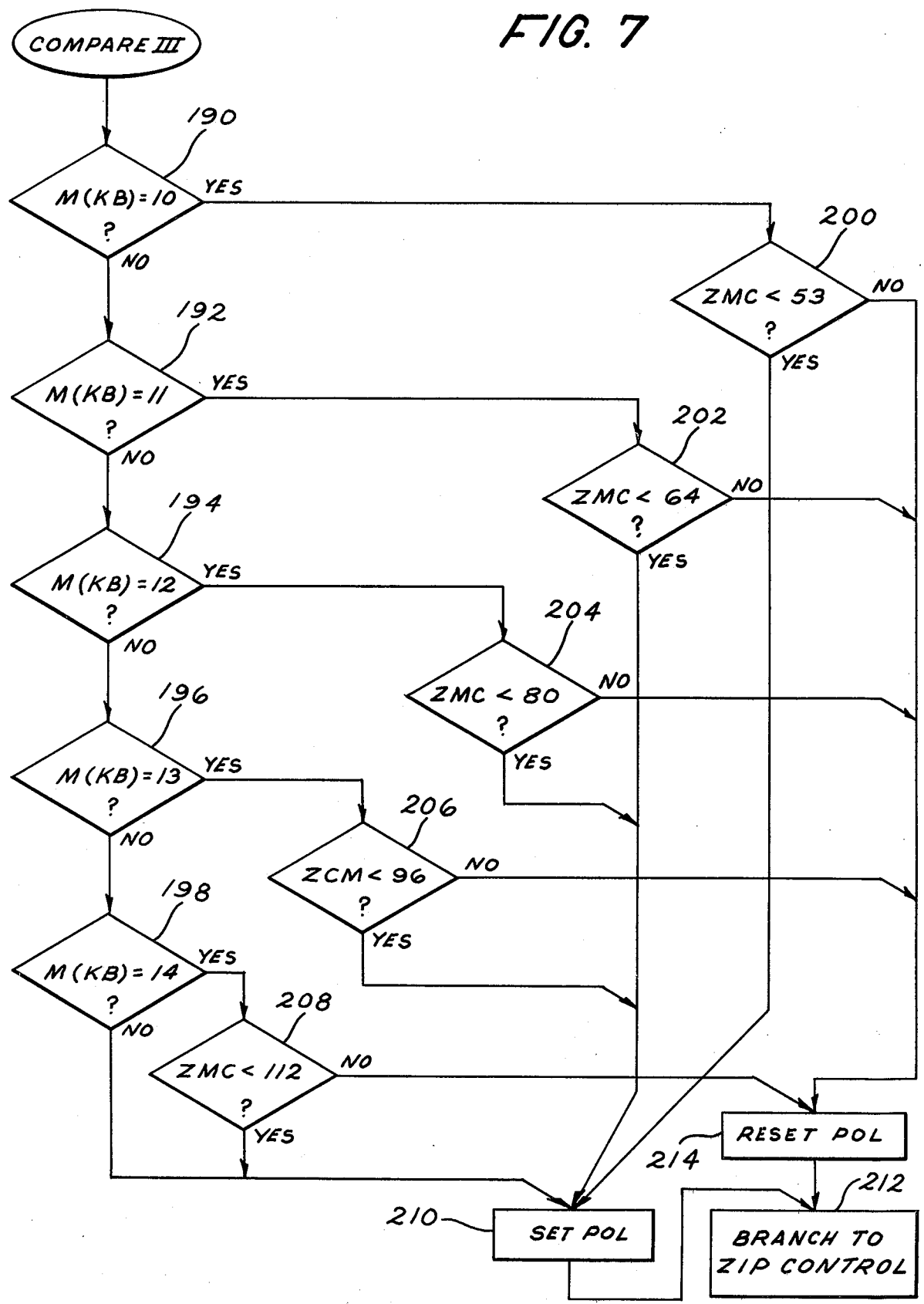

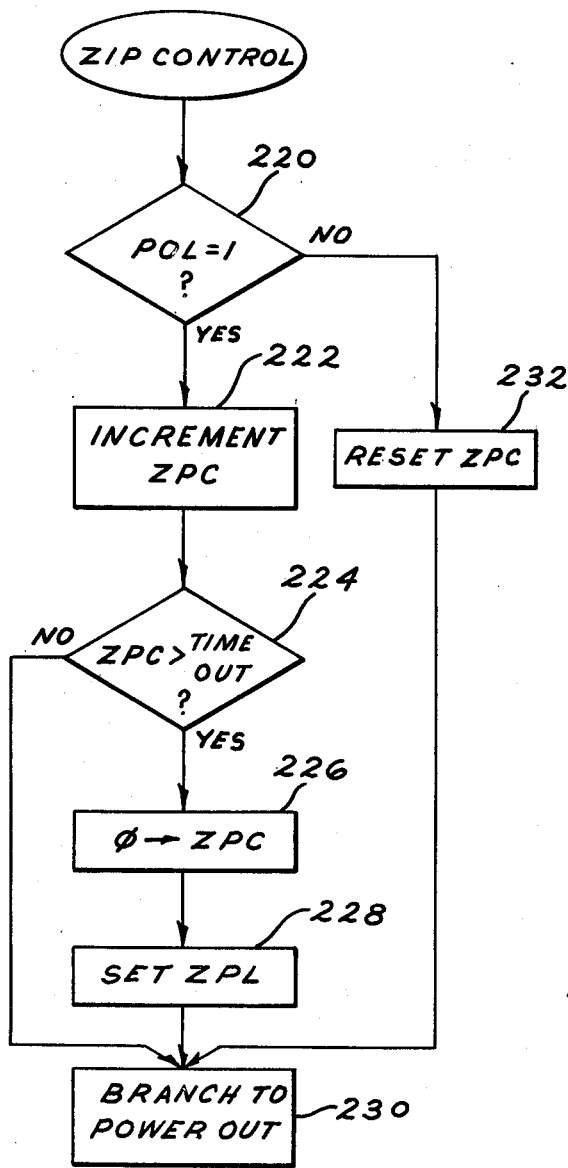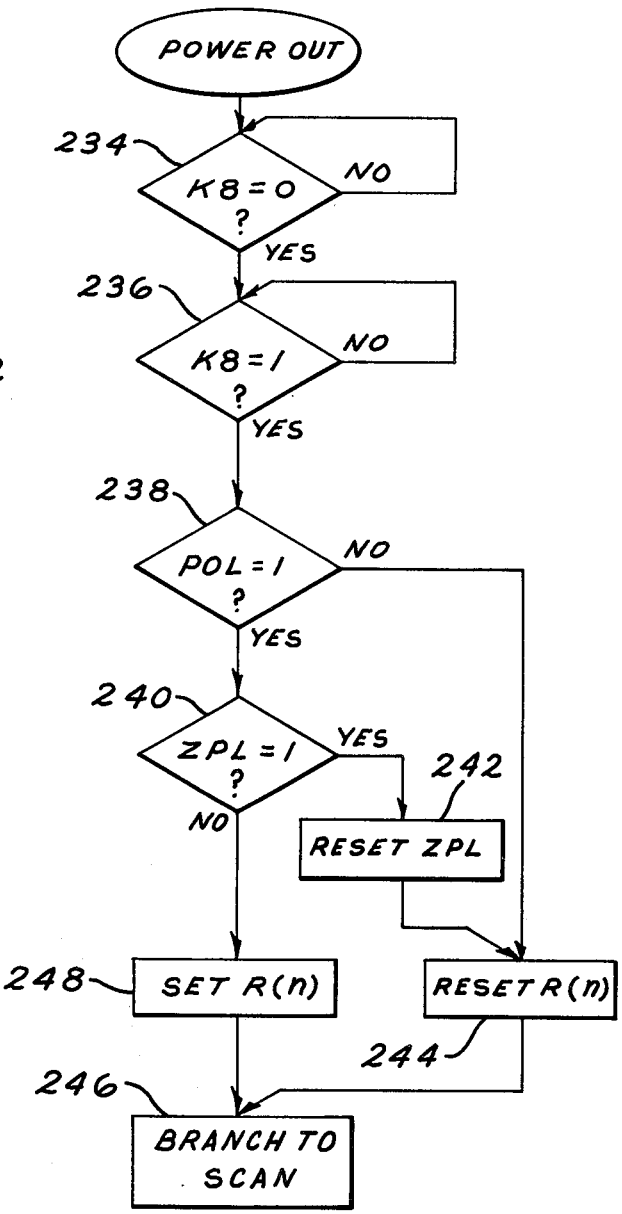

PROTECTIVE CONTROL ARRANGEMENT FOR DUTY CYCLE CONTROLLED SHEATHED HEATING ELEMENTS

CROSS-REFERENCE TO RELATED APPLICATION

This application is related to the following commonly-assigned, copending U.S. patent application, Ser. No. 337,877, filed Jan. 7, 1982, in the names of Thomas R. Payne and Robert V. Chou. The disclosure of the above-noted application is hereby incorporated by reference.

BACKGROUND OF THE INVENTION

The present invention relates generally to protective methods and circuits for sheathed electrical resistance units. More particularly, the invention relates to a method and circuits for reliably preventing or interrupting a fault in the form of an arcing short which may occur between the heating element and the grounded conductive outer sheath of such a heating unit. Conveniently, and by way of example, the invention may be employed in household appliances incorporating heating units such as ranges, hotplates and other cooking appliances, as well as dishwashers.

Sheathed electrical resistance heating units have been employed for many years in various products including, for example, electric ranges and dishwashers. Such heating units generally comprise a heating element in the form of a spiralled, electric resistance wire encased in an elongated, ceramic-filled, metallic outer sheath which is electrically conductive. The ceramic material transmits heat but, in its normal state, is an electrical insulator. Thus, the outer sheath becomes thermally hot, but normally remains electrically insulated from the heating element. A suitable ceramic material is magnesium oxide. Sheathed electrical resistance heating units of this general type are described in U.S. Pat. No. 2,094,480 to Vogel; and U.S. Pat. No. 3,592,771 to Vedder et al, the disclosures of which are hereby incorporated by reference.

In the operation of such heating units, the terminals of the heating element are connected to a power source, for example, a 60 Hz household AC power line which may be 120 volts or 240 volts. A 120 volt heating unit is normally connected between the hot side and neutral of a 120 volt unbalanced to ground line. A 240 volt heating unit is normally connected across both sides of a 240 volt balanced line. Normally, the outer conductive sheath is grounded.

While for the most part such heating units perform satisfactorily, one failure mode which is possible in such a heating unit is associated with a breakdown in the insulation qualities of the magnesium oxide separating the heating element from the outer sheath, accompanied by the formation of a current path between the element and the outer sheath. For reasons not fully presently understood, occasionally a discontinuity develops in the heating element resulting from a physical separation or break in the element itself. This break in the element creates an arc at the discontinuity between the two ends created by the break. The intense heat from the arc rapidly creates a plasma condition in which some of the magnesium oxide material in the vicinity of the arc is vaporized and some is melted. The nature of the magnesium oxide is such that in its solid state it provides a very high resistance; however, in its combined molten liquid and plasma state the resistance becomes relatively less. Thus, as the magnesium oxide melts and vaporizes, a current path of relatively low resistance, is formed from the discontinuity through the molten MgO to the grounded metallic sheath. At this point, the arc transfers from one or both break-created ends of the heating element to the sheath. The force generated by this phenomenon may in some cases actually create a separation or rupture in the outer sheath. Once it starts, such an arc and accompanying disruption in the outer sheath travels lengthwise along the sheath. This phenomenon is commonly referred to as "zippering" because the propagation of the disruption along the outer sheath resembles the opening of a zipper.

One device for rapidly terminating "zippering," should it occur in a heating element of the type employed in a dishwasher, is disclosed in U.S. Pat. No. 4,044,224 issued to Jenkins and Herbst. The Jenkins and Herbst device replaces the direct electrical connection between the outer conductive sheath and ground with a fusible link. During normal operation of the heating unit when the insulation material is intact, substantially no current flows through the outer sheath ground connection (with the exception of a small amount of AC leakage current largely a the result of capacitive effects). However, when a fault occurs, significant current flows through the outer sheath ground connection, causing the fusible link to open. Additional examples of switching and fuse arrangements responsive to changes in current supplied to the heating unit occasioned by ground faults may be found in commonlyassigned U.S. Pat. No. 4,054,857 to Bowling; and commonly-assigned, copending patent application Ser. No. 282,574 to Wellman and Horning, as well as British Pat. No. 946,623 to Ryder. Each of these latter references disclose current actuated switching arrangements employed in ranges and cooking appliances to disconnect power from the heating unit in the event of a ground fault.

Commonly-assigned, copending U.S. patent application Ser. No. 337,887, filed Jan. 7, 1982 by Payne et al describes and claims a protective control arrangement for at least limiting the propagation of the disruption along the length of the sheath. Payne et al periodically deenergizes the heating element regardless of the power setting for the element. Such deenergizations are selected to interrupt any arc which may have developed since this last deenergization and maintain the interruption for a period of time sufficient to allow the molten insulation material to return to a relatively high resistance state in which it once again effectively insulates the heating element from the grounded sheath. The present invention is an improvement over that protective circuit.

SUMMARY OF THE INVENTION

Briefly stated, in accordance with one form of the invention, a protective control arrangement for an apparatus incorporating heating units of the type comprising the concentric assembly of a resistive heating element embedded in an insulating material enclosed with a metallic sheath energized in accordance with a duty cycle power control scheme, which prevents the rupture or separation in the sheath caused by an arc at a discontinuity in the heating element from propagating along a substantial portion of the sheath is provided.

The control arrangement comprises switch means adapted to be operatively coupled to the heating element for selectively coupling and decoupling the heating element and the external power supply. Control means controls the duty cycle of each heating element by periodically decoupling the heating element from the power supply for idle periods of predetermined duration by opening the switch means. Timing means associated with each heating element monitors the time between power decouplings. Whenever the time between decouplings for the associated heating element exceeds a predetermined maximum time, the control means responds by decoupling power from the heating element for a predetermined recovery period.

Briefly stated, in accordance with another form of the invention, a protective control arrangement for an apparatus incorporating a plurality of heating elements of the aforementioned type is provided which employs a single common timing means regardless of the number of heating elements to monitor the time between power decouplings. In this arrangement, a commutated relay power control scheme is employed which utilizes a master relay shunted by a diode and in series with a parallel array of pilot relays, each serially coupled with an associated heating element. The pilot relays are selectively switched to provide the desired duty cycle for the associated heating element. Whenever the state of a pilot relay is to be changed, the following switching sequence is employed: (a) the master relay is opened during a positive half-cycle of the supply voltage signal during which the diode is forward biased; (b) the state of the pilot relay is changed during the following negative half-cycle of the supply voltage signal when the diode is reverse biased; (c) the master relay is reclosed during the next positive half-cycle of the supply voltage signal. The common timing means monitors the time between openings of the master relay. Whenever the time between openings of the master relay exceeds a predetermined maximum time, the control means responds by opening the master relay, thereby interrupting power to all heating elements for a predetermined recovery period. The predetermined maximum time between master relay openings is selected such that an arc occurring between interrupts is terminated before any resultant separation or rupture of the heating element sheath can propagate along a substantial portion of the length of the sheath.

BRIEF DESCRIPTION OF THE DRAWINGS

FIGS. 5–7 are flow diagrams of the Power Compare Routine incorporated in the control program for the microprocessor in the circuit of FIG. 3.

FIG. 8 is a flow diagram of the Zip Control Routine incorporated in the control program for the microprocessor in the circuit of FIG. 3.

FIG. 9 is a flow diagram of the Power Out Routine incorporated in the control program for the microprocessor in the circuit of FIG. 3.

DETAILED DESCRIPTION OF THE INVENTION

While the novel features of the invention are set forth with particularity in the appended claims, the invention both as to organization and content will be better understood and appreciated along with other objects and features thereof from the following detailed description taken in conjunction with the drawings.

Figure 1:
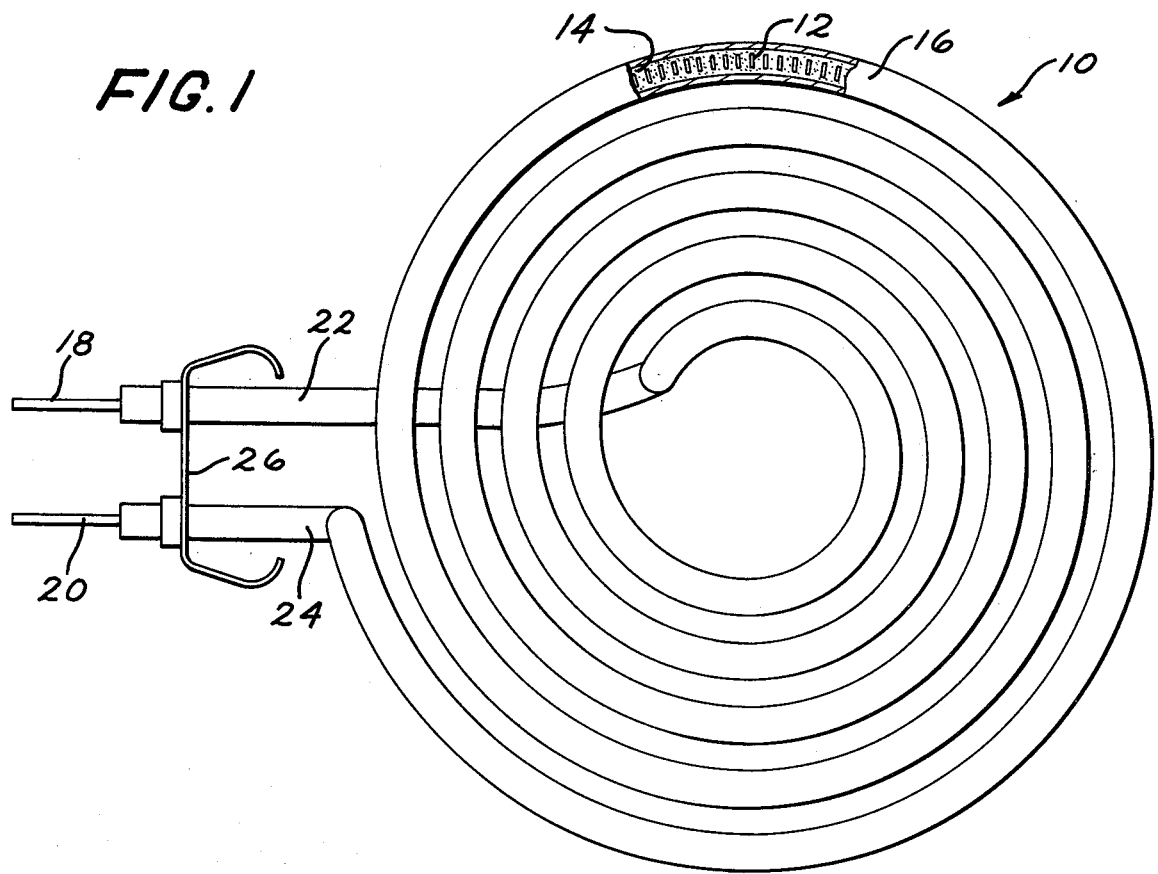
FIG. 1 is a simplified plan view of the sheathed electrical heating unit of the type employed with a protective control arrangement of the present invention, partially in section, to show the interior of the heating element.

Referring now to the drawings wherein identical reference numerals denote similar or corresponding elements throughout the various Figures, FIG. 1 shows the physical arrangement of an electrical heating unit of the type employed with the protective arrangement of the present invention. Heating unit 10 is of conventional sheathed heating unit construction comprising the concentric assembly of a resistive heating element 12 of spiral or helical configuration embedded in an insulating material 14 such as a compacted formulation of magnesium oxide powder which serves both as a thermal conductor and an electrical insulator, enclosed within a metallic sheath 16. Opposite connecting pins 18 and 20 of heating element 14 extend from the radially projecting end portions 22 and 24 of sheath 16 respectively, for connection to an external power supply, when installed in an apparatus. A grounding clip 26 formed of a strip of thin conductive material, such as stainless steel, is secured across end portions 22 and 24 of the outer sheath 16 to provide a ground connection for the sheath when installed in a cooking appliance.

As mentioned briefly in the Background discussion, heating elements of the type shown in FIG. 1 for reasons not fully understood are susceptible to discontinuities developing in the resistive element. Such discontinuities, for example, may result from oxidation at a point on the heating element which reduces the wire to a very fine filament which ultimately breaks, creating the discontinuity. The oxidation may be the results of a hot spot occurring along the element due to poor thermal conductivity at that point. Another possibility is a foreign substance present in the insulating material which may attack the protective outer layer of non-porous chrome oxide which ordinarily protects the heating element against destructive oxidation. In any event, when such a discontinuity develops in an energized heating element, an arc is developed at the discontinuity between the resultant slightly separated ends of the now broken element. The intense heat generated by the arc is sufficient to rapidly change the insulating material immediately proximate to the arc to a plasma state. At the fringe of the plasma region the insulating material is changed to a molten liquid state. The plasma region expands radially toward the outer sheath as the heat from the arc progressively vaporizes the insulating material. At the same time, the heating element itself is gradually consumed increasing the gap which must be bridged by the arc. At some point, as the plasma progresses toward the sheath, the insulating material between the discontinuity and the sheath becomes substantially non-crystalline, i.e., primarily a combination of plasma and molten liquid. At which time a relatively low resistance path exists between the heating element and the sheath. The low resistance path results from the fact that although in its normal solid or crystalline state the insulating material is characterized by a high resistance, in its plasma and liquid states its resistance is relatively low. When such a condition exists and the element-to-element arc length becomes greater than the element-to-sheath distance, the arc transfers from bridging the gap in the heating element to bridging the gap between one or both of the break-created ends of the element and the grounded sheath. The arc from element to sheath disrupts or separates the sheath proximate to the arc. This arc and disruption then progresses along the length of the heating element away from the break in the element toward a connecting pin. The break may propagate in one direction from one side of the discontinuity or in both directions, starting from each side of the discontinuity. If allowed to propagate to a connecting pin, the phenomena will terminate with a potentially large current surge caused by the dead short to ground presented to the power source upon reaching an end of the element. Therefore, it is desirable to extinguish the arc before the disruption has propagated to a connecting pin.

The heating unit employed in the illustrative embodiment herein described is a standard range surface unit commercially available from General Electric Company identified by Part Number WB30X218. It has been observed that for such heating units an arc at a discontinuity in the heating element has associated with it a nominal breakdown time for sufficiently reducing the insulating material proximate to its relatively low resistance state so as to provide a relatively low resistance current path from the discontinuity to the sheath. This time varies, depending upon the operating state of the heating element at the time the discontinuity occurs. The time required for the insulating material to form a low resistance path from the element to the sheath, should such a discontinuity develop when the element is initially energized and thus relatively close to room temperature, will be longer than that required if the discontinuity occurs while the element has been operating at a steady state operating temperature. Also, the time required is a function of the configuration of the heating element, the exact composition of the insulating material and other design features. However, it is believed, based upon limited observations, that for heating elements of the type employed in the illustrative embodiment, which is representative of those presently conventionally employed in domestic electric ranges, should the discontinuity occur when the element is operating at or near its maximum operating power, a nominal breakdown time on the order of one second or less is required from the initiation of the arc to initial disruption of the sheath. As mentioned hereinbefore, if unchecked, the arc at the discontinuity may transfer to the sheath and generate sufficient energy to rupture the sheath.

While propagation of the separation is somewhat unpredictable, based upon limited observations it is believed that typically the separation propagates along heating units of the type normally used as surface heating units for cooking appliances at a rate on the order of 2-3 inches per minute.

It has further been observed that the insulating material of such heating units has associated with it a nominal recovery time required to allow the resultant relatively low resistance insulating material sufficiently to re-crystallize to a relatively high resistance hardened state upon extinguishing the arc by interruption of power to the heating element. For typical cooking appliance heating units, this nominal recovery time has been observed to be less than 8.3 milliseconds, corresponding to one-half cycle of the standard 60 Hz power signal.

In accordance with one form of the present invention, there is provided an improved protective control arrangement for duty cycle controlled sheathed heating units which limits the propagation of the disruption resulting from the development of a discontinuity in the heating element along the length of the heating unit by deenergizing the heating element whenever the element has been continuously energized for a predetermined period, thereby interrupting any arc which may have developed since the last occurring interrupt and maintaining the interruption for a period of time sufficient to allow the insulating material to return to a relatively high resistance state so as to once again effectively insulate the heating element from the grounded sheath.

This form of the invention takes advantage of the fact that, in carrying out a duty cycle power control scheme for various power levels, power to the heating element is periodically interrupted for power control purposes. The period between power control interrupts depends upon the duration of the control period and the duty cycle associated with the power level selected. Such power control interruptions, when greater than 8.3 milliseconds long, are effective for zipper protection purposes. Thus, in accordance with the present invention, the control means is arranged to interrupt power to the heating element for zipper protection purposes only when the period between power control interrupts is greater than the desired period for zipper protection. By operating in this fashion, the additional switching necessary for zipper protection is minimized.

To this end, according to one form of the invention, timing means in the form of a zipper counter ZPC is associated with each heating element. Each ZPC is arranged to repetitively count a predetermined maximum number of cycles of the 60 Hz power supply voltage signal and reset, the maximum count being selected according to the desired maximum time between interruptions of power to the heating element for zipper protection. Control means responsive to the ZPC is effective to interrupt power to the heating element for a period sufficient to allow any insulation material reduced by an arc to a low resistance state to return to its high resistance state for zipper protection, each time the time between interrupts exceeds the maximum time corresponding to the maximum count of the ZPC. However, the control means is also effective to reset the ZPC whenever power is interrupted for power control purposes. Thus, the ZPC only reaches its maximum count when the heating element has been continuously energized between power control interrupts for a time period corresponding to the ZPC maximum count.

The maximum ZPC count establishes the maximum time between successive interruptions of power. In selecting the maximum time between successive power interrupts, a balance must be struck between, on the one hand, relatively short time periods requiring excessive switching which could shorten the lifetime of the switching devices and providing unacceptable heating efficiency and, on the other hand, relatively long time periods resulting in a higher than desired possibility of a separation propagating to a connecting pin.

In estimating the latter possibilities, it is assumed that a discontinuity may occur with equal probability at any point in the heating element. Thus, the chances of a discontinuity occurring within a certain distance d of one of the connecting pins may be expressed as the ratio of the distance d to the total sheath length L. Since there are two connecting pins, should such a discontinuity occur, the chances of it occurring within distance d of either pin, rather than a distance greater than d, is obtained by doubling this ratio.

For a given propagation rate r, and time between interrupts T, the maximum distance of propagation between interrupts is $r \times T$. Thus, if a discontinuity occurs within this maximum propagation distance of either connecting pin, $r \times T$, i.e., if $d = rxt$, the probability of a separation propagating to a connecting pin may be expressed as $$\frac{2 \times (r \times T)}{L}.$$

A nominal propagation time for purposes of this description is defined as the time required for a disruption or separation to travel 1/4 of the length of the heating unit. The ratio of twice this distance to the total length of the heating unit is ½. Thus, the probability of a discontinuity occurring at a point along the sheath which could travel to a connecting pin in this nominal propagation time is ½. Stated another way, if the time between interrupts is selected to be equal to the nominal propagation time, 50 percent of the ruptures which occur would be terminated before propagating to a connecting pin. For a propagation rate of 3 inches/minute and a 60 inch heating unit sheath, the nominal propagation time is 5 minutes.

By selecting a time between interrupts which is less than 5 minutes, more than 50 percent of any ruptures which occur would be terminated before propagating to a connecting pin; how much more than 50 percent is determined by how much less than this nominal propagation time the period between interrupts is selected to be. For a time period between interrupts of one minute or less, this figure would be in the range of 10 percent or less. For a propagation rate of 3 inches/minute and a unit length of 60 inches, the distance would be on the order of 3 inches.

In duty cycle power control schemes, an additional advantage in terms of switching economy may be realized by selecting the time between interrupts for zipper protection to be greater than or equal to the duty cycle control period when the control period is sufficiently short to allow such a selection.

In the duty cycle control scheme, the idle or power-off periods of the control period occur in the latter portion of each control period. Thus, by selecting the time between interrupts to be at least equal to the control period, switching for zipper protection will be necessary only at the maximum 100 percent power setting because for all lower settings, power control interrupts will occur within the maximum allowable time between interrupts.

Figure 3:
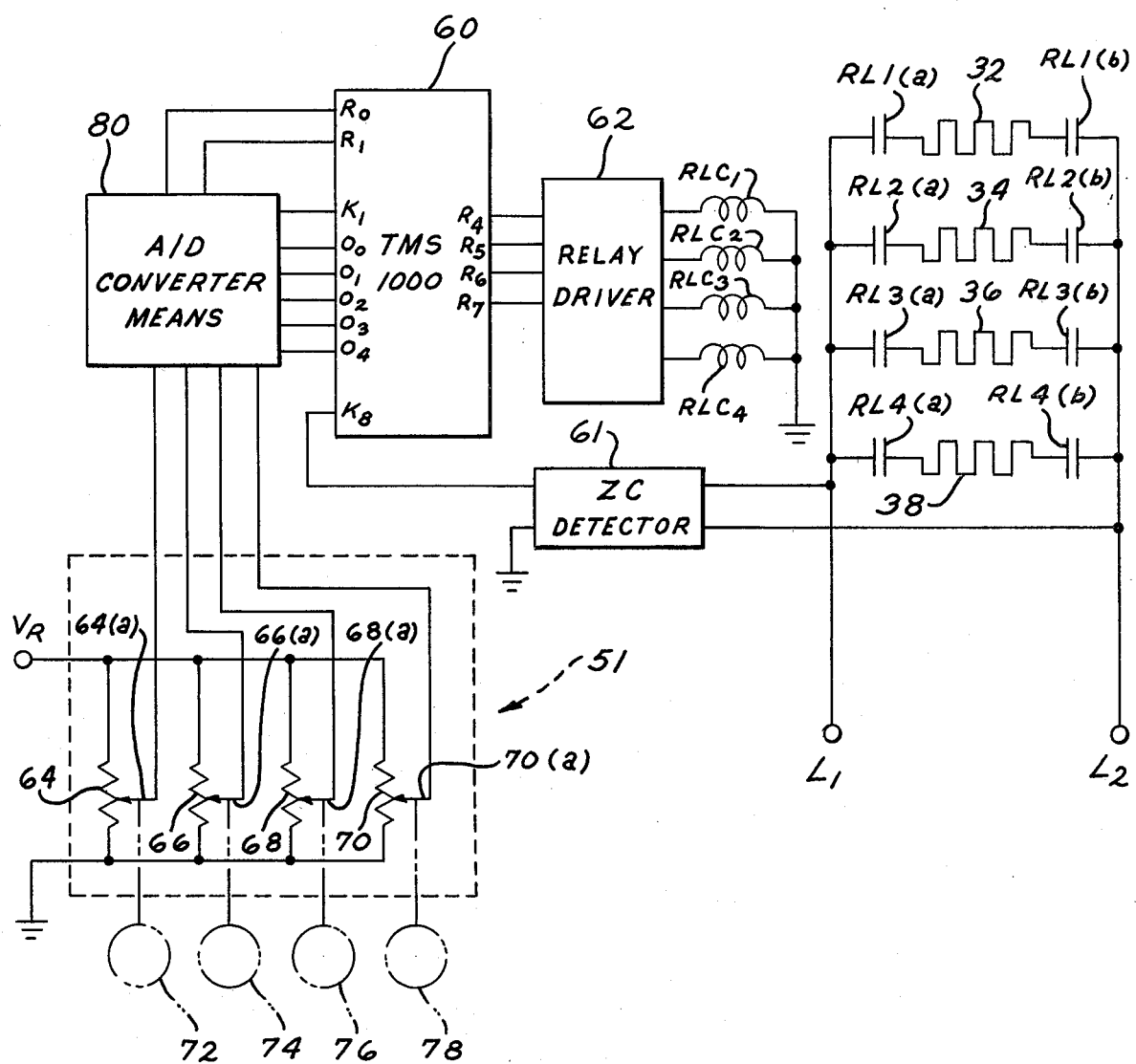
FIG. 3 is a schematic diagram of a microprocessor based control circuit illustratively embodying the control arrangement of FIG. 2.

In the illustrative embodiment of FIG. 3, the control period comprises 128 control intervals, each comprising 4 cycles of the 60 Hz voltage signal from an external power supply for a time period of roughly 8.5 seconds. A time between interrupts of approximately 17 seconds corresponding to twice the control period is employed in the illustrative embodiment. Using the above formula and substituting r=3 inches/minute, L=60 inches and T=17.06 seconds, the probability, expressed as a percentage, of a separation, should one occur, propagating to a connecting pin is less than 3 percent, which is considered to be well within desirable limits.

For this time period, the maximum duration of the separation phenomena is actually slightly less than 17 seconds since a finite time on the order of ½-1 second is required from the beginning of the arc until the sheath separation occurs. At a propagation rate of 3 inches/minute, the maximum propagation distance is roughly ¾ inches. Consequently, this choice of time period confines the duration of the propagation period within acceptable limits, thereby preventing the separation from propagating along a substantial portion of the length of the heating element.

Figure 2:
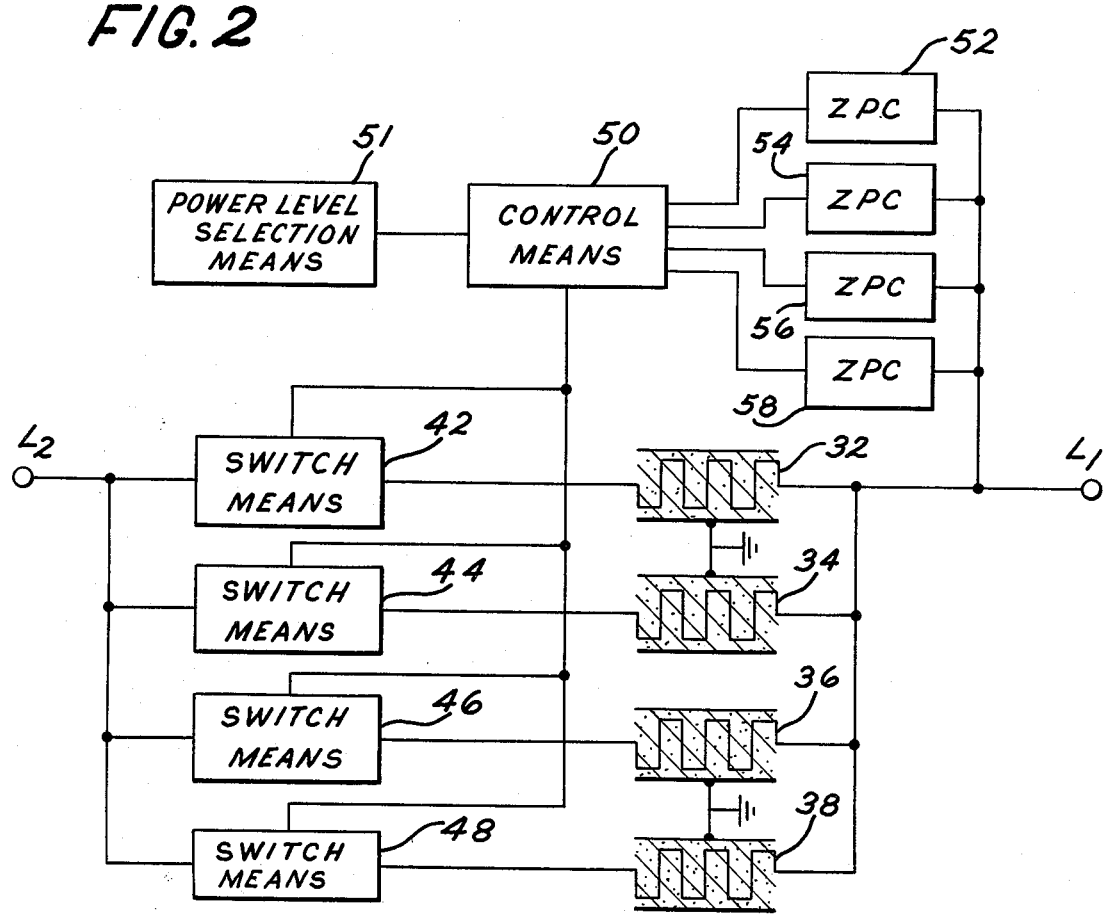
FIG. 2 is a simplified functional block diagram of a control arrangement in accordance with one form of the present invention.

A generalized block diagram illustrating a protective arrangement in accordance with this form of the invention is shown in FIG. 2, wherein heating units 32-38 are energized by a standard 60 Hz AC power supply which can be 120 volts or 240 volts applied across terminals L1 and L2. Power applied to each of heating elements 32-38 is controlled by switch means 42-48, respectively, each of which is connected in series with its associated heating element. Switch means 42-48 are independently selectively switched into conduction by trigger signals generated by the control means 50. Control means 50 generates these trigger signals in accordance with power settings for the various heating elements entered by the user via input selection means 51.

Power control means 50 implements a duty cycle control scheme by controlling the percentage of time power is applied to each of the heating elements 32-38 in accordance with the power level setting individually selected for each heating unit by the operator. In the illustrative embodiment, a predetermined control period comprising a fixed number of control intervals is employed as the time base for the duty cycle power control.

Each heating element is switched into conduction for a particular number of control intervals during each control period, based on the corresponding operator selected power setting. The ratio of conductive control intervals to the total control intervals in the control period, expressed as a percentage, is referred to hereinafter as the duty cycle. Each control interval comprises four cycles of the standard 60 Hz 240 volts AC power signal, corresponding to a period of approximately 67 milliseconds. Each control period comprises 128 control intervals corresponding to a period of approximately 8.5 seconds duration. The duration for the control interval in this embodiment was chosen to be four cycles because one cycle is used to execute the control routine for each heating unit. Thus, for the four heating unit embodiment the control routine is executed once every four cycles for each heating element. The duration for the control period was selected to provide a satisfactory range of power settings for desired cooking performance. It is understood that control intervals and control periods of greater or lesser duration could be similarly employed.

In carrying out the control scheme, the percentage of ON time or duty cycle for each power level is obtained by switching the switch means associated with a particular heating element into conduction for a predetermined number of control intervals during each control period. TABLE I shows the percentage ON time and the number of conductive control intervals per control period for each of the 16 power settings. The duty cycles for each of the power cycles was determined empirically to provide the desired range of cooking temperatures for satisfactory cooking performance. It is understood that other duty cycles could be similarly employed.

TABLE I

| COL. 1 SELECTED POWER LEVEL | COL. 2 % ON TIME | COL. 3 ON CONTROL INTERVALS PER CONTROL PERIOD | COL. 4 OFF CONTROL INTERVALS |
|---|---|---|---|
| 0 | 0 | 0 | 128 |
| 1 | 2 | 3 | 125 |
| 2 | 3 | 4 | 124 |
| 3 | 5 | 7 | 121 |
| 4 | 8 | 10 | 118 |
| 5 | 11 | 14 | 114 |
| 6 | 14 | 18 | 110 |
| 7 | 20 | 26 | 102 |
| 8 | 26 | 33 | 95 |
| 9 | 33 | 42 | 86 |
| 10 | 41 | 53 | 75 |
| 11 | 50 | 64 | 64 |
| 12 | 60 | 80 | 48 |
| 13 | 72 | 96 | 32 |
| 14 | 85 | 112 | 16 |
| 15 | 100 | 128 | 0 |

Referring now to FIG. 3, there is shown in simplified schematic form, a microprocessor based control circuit which incorporates an illustrative embodiment of a protective arrangement in accordance with this form of the present invention. Power to heating elements 32-38 is provided by application of a standard 60 Hz AC power signal of either 120 or 240 volts across terminals L1 and L2. Heating elements 32-38 are arranged in an electrical parallel fashion across lines L1 and L2 via an array of relays RL1, RL2, RL3 and RL4, respectively, each relay having two sets of contacts (a) and (b) connected between the heating element and lines L1 and L2, respectively, for elements 32-38, respectively.

Control signals for opening and closing relays RL1-RL4 are provided by microprocessor 60. A 60 Hz signal is generated by a conventional zero crossing detector 61 and applied to microprocessor input port K8 for purposes of synchronizing system operation with zero crossings of the power signal applied across terminals L1 and L2. Relay control signals from output ports R4-R7 are coupled to relay coils RLC1 through RLC4 of relays RL1-RL4, respectively, by relay driver network 62. These control signals are generated by microprocessor 60 in accordance with the power level selected by the user in a manner to be described hereinafter.

Means for enabling the operator to select the desired power level for each of the heating elements 32-38 is provided by power level selection means designated generally 51. Power level selection switch means 51 comprises a set of four potentiometers 64-70 connected in parallel, for controlling of heating element 32-38, respectively. A constant reference voltage is applied across these potentiometers. Wiper arms $64(a)$-$70(a)$ for potentiometers 64-70, respectively, are positioned in accordance with the power settings selected by operator manipulation of the corresponding ones of control knobs 72-78. Conventional analog to digital converter means 80 scans the setting from each of potentiometers 64-70 to provide a digital input signal to microprocessor 60 representing the power level selected for each heating element. Scanning signals are output from microprocessor 60 at output ports $0_0$ through $0_4$. The power level signal is input to microprocessor 60 at input port K1.

Microprocessor 60 of the circuit of FIG. 3 is a TMS 1000 series microprocessor. Technical details concerning the general characteristics of microprocessor 60 are available in Texas Instruments, Inc. publication entitled, "TMS 1000 Series Data Manual," published in Dec. 1975, which is hereby incorporated by reference.

CONTROL PROGRAM

Microprocessor 60 is customized to perform the control functions of this invention by permanently configuring the ROM of the microprocessor to implement predetermined control instructions. FIGS. 4-9 are flow diagrams which illustrate the control routines incorporated in the control program of microprocessor 60 to perform the control functions in accordance with one form of the present invention. From these diagrams, one of ordinary skill in the programming art can prepare a set of instructions for permanent storage in the ROM of microprocessor 60. For the sake of simplicity and brevity, the control routines to follow will be described with respect to the control of heating element 32. It should be understood that for the control system of FIG. 3 the control program is sequentially executed once for each of heating elements 32-38 during each control interval. It should be further understood that in addition to the control functions of the present control arrangement there may be other control functions to be performed in conjunction with other operating characteristics of the appliance. Instructions for carrying out the routines described in the diagrams may be interleaved with instructions and routines for other control functions whch are not part of the present invention.

The control program consists of a sequence of routines illustrated in the flow diagram. The control program is cycled through once each control interval for each heating element. A description of each routine with reference to the flow diagram follows.

SCAN ROUTINE—FIG. 4

The function of this routine is to scan the operator controlled input potentiometers 64–70, FIG. 3, to determine the power setting selected for each of the heating elements. During execution of this routine for a particular heating element, the potentiometer associated with that heating element is scanned.

It will be recalled that there are 16 possible power settings represented by digital signals corresponding to the number of the settings from 0–15. In this routine, PLR is a 4-bit digital word which sets the reference voltage in the A/D conversion scheme via a resistive ladder network portion (not shown) of A/D converter 80. PLR is varied in accordance with a successive approximation technique and the voltage generated in the A/D converter is then compared to the voltage across the corresponding one of operator adjustable potentiometers 64–70 to determine the power level selected. The result of the comparison determines the state of input port K8.

The search starts in the middle with PLR equal to eight (PLR—1000) (Block 102). Inquiry 104 determines if the operator selected power setting is higher (K1=1) or lower (K1=0). If higher, PLR is set equal to 12 by setting Bit 2 (PLR—1010) (Block 106). If lower, PLR is set equal to 4 by resetting Bit 3 (Block 108) and setting Bit 2 (Block 106) (PLR—0010).

Inquiry 110 determines if the setting is higher or lower than the present PLR. If higher (K1=1) the PLR is increased by 2 by setting Bit 1 (Block 112). If lower (K1=0) PLR is decreased by 2 by resetting Bit 2 (Block 114) and setting Bit 1 (Block 112).

Inquiry 116 determines whether the present value of PLR is higher or lower than the reference. If higher, PLR is increased by 1 by setting Bit 0 (Block 118). If lower, PLR is decreased by 1 by resetting Bit 1 (Block 120).

Inquiry 122 repeats the higher or lower test on the selected value. If higher, PLR is read into KB (Block 124). If lower, PLR is reduced by 1, by resetting Bit 0 (Block 126) and then PLR is read into KB (Block 124).

The Master Counter (ZCM) utilized for power control in the Power Compare Routine is incremented (Block 128). The ZCM count is checked by Inquiry 130. If greater than 128, ZCM is reset (Block 130). The program then branches (Block 134) to the Power Compare Routine, FIG. 5.

POWER COMPARE ROUTINE—FIGS. 5–7

This routine performs the primary power control function, namely, to determine during each control interval whether or not the heating element is to be energized for the ensuing control interval. This is done by comparing the count of the Master Counter (ZCM) to a number corresponding to the number of control intervals for which the heating element is energized per control period for the power setting selected. For M(KB) representing the OFF power setting (Yes to Inquiry 140) no comparison is necessary. POL is reset (Block 150) and the program branches (Block 151) to the Zip Control Routine, FIG. 8. For M(KB) representing one of power settings 1–4 (Yes to one of Inquiries 142–148, the ZCM count is compared to reference counts 3, 4, 7 and 10 (Inquiries 152–158) respectively. If the power level selected is one of these levels 1–4 and the ZCM count is less than the reference corresponding to that power level, the heating element will be energized during the ensuing control interval. To this end the Power Out Latch (POL) is set (Block 160) and the program branches (Block 151) to the Zip Control Routine, FIG. 8. If the ZCM is not less than the corresponding reference value of the selected power level, the element will not be energized. To this end, POL is reset (Block 150) and the program branches (Block 151) to the Zip Control Routine, FIG. 8.

If the selected power level is not one of levels 1–4, the program continues (FIG. 6) at entry point Compare 11. Inquiries 162–170 determine whether the selected power level is one of levels 5–9, respectively. The corresponding reference values for these power levels are 14, 18, 26, 33 and 42, respectively. If the selected power level is one of levels 5–9 and the ZCM count is less than the corresponding reference value as determined by Inquiries 172–180, respectively, the heating element will be energized during the ensuing control interval. POL is set (Block 182) and the program branches (Block 184) to the Zip Control Routine. If one of these power levels is selected but the count is greater than the corresponding reference value, the heating element will not be energized during the ensuing control interval. POL is reset (Block 186) and the program branches (Block 184) to the Zip Control Routine, FIG. 8.

If the selected power level is not one of levels OFF–9, the program continues at Compare III (FIG. 7). Inquiries 190–198 determine whether power levels 10–14 have been selected, respectively. The reference values associated with these power levels are 53, 64, 80, 96 and 112, respectively. If the ZCM count is less than the reference value corresponding to the selected power level, as determined by Inquiries 200–208, respectively, the heating element will be energized during the ensuing control interval. POL is set (Block 210) and the program branches (Block 212) to the Zip Control Routine (FIG. 8). If one of these levels is selected but the ZCM count is greater than the reference value, POL is reset (Block 214) and the program branches (Block 212) to the Zip Control Routine, FIG. 8. Finally, if the answer to Inquiry 198 is No, the selection must represent power level 15, which is the maximum power level for which the heating element is energized for every control interval. Thus, POL is set (Block 210) and the program branches (Block 212) to the Zip Control Routine, FIG. 8.

ZIP CONTROL ROUTINE—FIG. 8

This routine performs the function of the Zipper Control Counter (ZPC) by operating as a counter for the associated heating element which is incremented when the POL for that element is set and reset when POL is reset. When the ZPC counter counts the predetermined number of counts designated Time Out, the counter is reset and the Zipper Control Latch (ZPL) is set. The effect of setting ZPL is to prevent the associated relay from being switched into conduction for the ensuing control interval regardless of the power control decision from the Power Compare Routine. It will be recalled that for the illustrative embodiment each control interval is of four 60 Hz voltage cycles duration. Thus, ZPC counts cycles of the 60 Hz voltage signal by being is incremented every four cycles when the POL is set. A Time Out value of 256 counts corresponds to a period of approximately 17 seconds which comprises two control periods. Thus, whenever the POL remains set for 1024 successive cycles (or 17 seconds), the ZPC counter will time out.

Referring now to FIG. 8, Inquiry 220 checks the state of the Power Out Latch (POL). If set, (POL=1) the ZPC counter is incremented (Block 222). Inquiry 224 determines when ZPC counts the predetermined number of cycles designated Time Out. If ZPC is greater than Time Out, the ZPC counter is reset (Block 226); Zipper Control Latch (ZPL) is set (Block 228), and the program branches (Block 230) to the Power Out Routine, FIG. 9. If POL is not set, indicating that the heating element will not be energized, i.e., power to the heating element will be interrupted during its ensuing control interval, the ZPC counter is reset (Block 232) and the program branches (Block 230) to the Power Out Routine, FIG. 9.

POWER OUT ROUTINE—FIG. 9

This routine synchronizes the program with the beginning of the next full cycle of the 60 Hz voltage signal applied across L1 and L2, then generates control signals at the output port R(n), the index n signifying the particular heating element for which the routine is presently being executed. (R4-W-R7 are associated with relays RL1-RL4 respectively, for controlling heating elements 32-38 respectively.) When R(n) is set the associated one of relays RL1-RL4 is switched into conduction, thereby causing the associated one of heating elements 32-38 to be energized. When R(n) is reset, the associated one of relays RL1-RL4 is switched to its non-conductive state, thereby interrupting power to the associated one of heating elements 32-38.

Referring now to the flow diagram of FIG. 9, Inquiries 234 and 236 delay the program until the next occurring positive going cycle of the 60 Hz voltage signal. K8 is the input port of microprocessor 60 responsive to the zero crossing detector circuit 61. K8 equals one and zero when the 60 Hz voltage signal is positive and negative, respectively. Thus, a Yes to Inquiry 234 and Inquiry 236 identifies a positive going transition of the voltage signal. At the beginning of the positive going half-cycle, Inquiry 238 checks the state of the POL. If set (POL=1) Inquiry 240 checks the state of Zipper Latch ZPL. If set, (ZPL=1) indicating that power is to be interrupted during the ensuing control interval, ZPL is reset (Block 242) and R(n) is reset (Block 244), thereby opening the associated one of relays RL1-RL4 and interrupting power to the associated heating element for one four-cycle control interval, i.e., until the next pass through the control routine for that heating element. The program then branches (Block 246) to the SCAN Routine to repeat the program for the next heating element. If ZPL is not set, (ZPL=1) then R(n) is set (Block 248) closing the associated relay and the program branches (Block 246) to the SCAN Routine to repeat the control program for the next heating element.

If POL is not set (POL=1) the associated relay is to be open for the next control interval. R(n) is reset (Block 244) and the program branches to SCAN to repeat the control program for the next heating element.

The foregoing description is directed to an embodiment of a form of the invention incorporating counter or timing means for each heating element. The description to follow is directed to an embodiment of another form of the invention which performs the zipper protection function with a single timing means or counter regardless of the number of heating units in the appliance.

Figure 10:
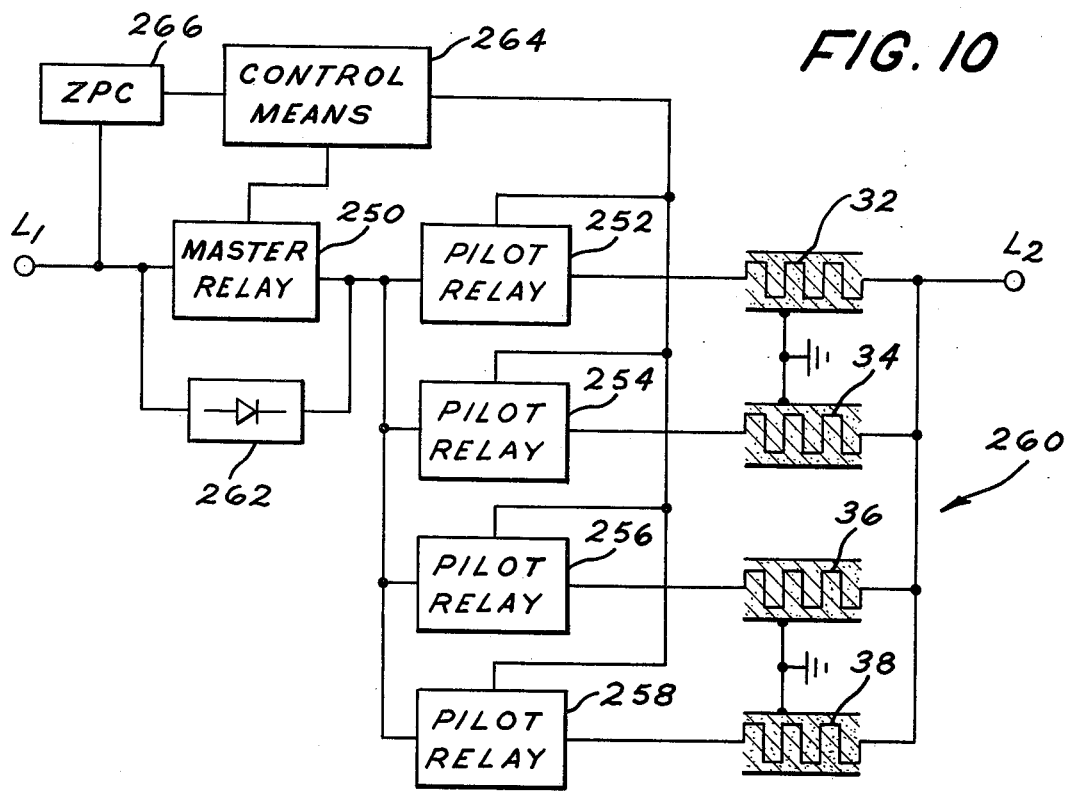
FIG. 10 is a simplified functional block diagram of a control arrangement in accordance with another form of the present invention.

Referring now to FIG. 10, there is illustrated in functional block diagram form a protective arrangement in accordance with another form of applicant's invention. The power control system of FIG. 10 employs a commutated relay scheme of the type described in commonly-assigned U.S. Pat. No. 4,296,449 to Eichelberger, the disclosure of which is hereby incorporated by reference.

In such a relay scheme, a master relay 250 is connected in series with a plurality of parallel connected pilot relays 252-258 each of which is serially connected with associated heating elements 32-38, respectively. The parallel connected pilot relay and heating element combinations comprise a parallel array, designated generally 260. The master relay 250 is adapted to couple the parallel array 260 to an external alternating current power supply such as the conventional 60 Hz 120 volt or 240 volt power supply found in the home. A diode 262 is connected in parallel with master relay 250, which when forward biased provides a current shunt around the master relay. The switching sequence implemented by control means 264 is arranged such that, when the state of any one of the pilot relays 252-258 is to be changed, the control means 264 opens the master relay 250 during a positive half-cycle (L1 positive relative to L1) of the power supply during which diode 262 is forward biased; the state of the pilot relay is changed during the next occurring negative half-cycle of the voltage signal from the power supply when diode 262 is reverse biased and master relay 250 is open; finally, master relay 250 is reclosed during the next occurring positive half-cycle of the power supply voltage signal. This sequence enables the changing of the state of the master relay and the pilot relays during periods of minimal current flow through the contacts, thereby subjecting the relays to only minimal voltages during such transitions.

For this switching sequence, implementation of a switching decision for a particular heating element requires essentially two cycles of the signal from the power supply. Thus, for a cooking appliance such as an electric range having four surface units, a total of eight cycles is required to serially implement the switching scheme for all four surface units. That is, the control program for each heating element is executed once every eight cycles. Thus, the control interval for this embodiment is chosen to be eight cycles. The control period comprises 128 control intervals corresponding to a time of approximately 17 seconds (1024 60 Hz voltage signal cycles). In this form of the invention advantageous use is made of the fact that whenever any of the surface units changes states, either from OFF (deenergized) to ON (energized) or ON to OFF, the master relay is opened for one-half cycle as the first step of the relay switching sequence. Thus, any change of state for any heating unit necessarily interrupts power to all heating units for one-half cycle of the 60 Hz voltage signal across L1 and L2.

As described hereinbefore, an interruption of power for a period on the order of one-half cycle of a 60 Hz signal is sufficient to allow the insulation material proximate to an arc at a discontinuity in the heating element to recover to a relatively high resistance state so as to terminate the breakdown phenomena. Consequently, according to this form of the present invention, the protective arrangement employs timing means in the form of a single Zipper Control Counter (ZPC) 266 regardless of the number of heating units in the appliance, arranged to repetitively count a predetermined number of 60 Hz voltage signal cycles and reset. Control means 264 is responsive to the ZPC and operates to open master relay 250 when the ZPC counts the predetermined number of cycles. The ZPC is reset by control means 264 whenever master relay 252 is opened. Thus, the zipper control feature of this form of the invention serves to override the power control scheme and open the master relay 252, thereby interrupting the application of power to all heating elements for one-half cycle whenever the master relay remains closed for a continuous period of time in excess of that corresponding to the maximum ZPC count. The considerations for selecting the maximum count are the same as those discussed hereinbefore with reference to the embodiment of FIG. 3.

Figure 11:
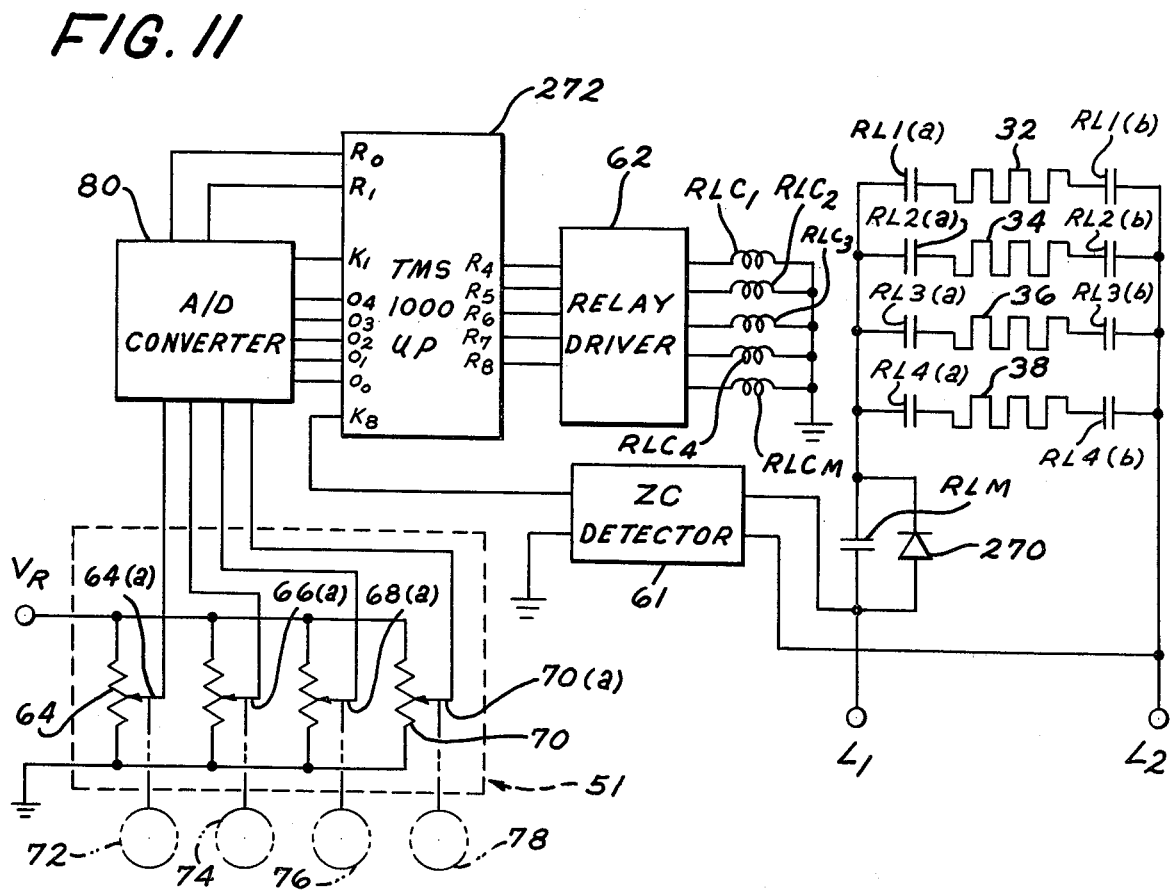
FIG. 11 is a schematic diagram of a microprocessor based control circuit illustratively embodying the control arrangement of FIG. 10.

Referring now to FIG. 11, there is shown in simplified schematic form a microprocessor based control circuit which incorporates an illustrative embodiment of a protective arrangement in accordance with this form of the present invention.

This circuit is similar to that of FIG. 3 except for the addition of the master relay RLM electrically connected in series between L1 and the parallel array of relay-heating element combinations comprising relays RL1-RL4 and heating elements 32-38 to selectively couple the array to the external power supply, and diode 270 connected in parallel with the contacts of relay RLM. The power level selection means 51, the A/D converter 80 and the zero crossing detector circuit 61 operate in the same manner as in the circuit of FIG. 3. Microprocessor 272 is coupled to the circuit in the same manner as microprocessor 60 of FIG. 3; however, the ROM is configured differently to implement the commutated relay switching scheme and to incorporate the protective arrangement in accordance with this form of the invention.

Relays RL1-RL4 comprising contacts RL1(a) and RL4(b)-RL4(a) and RL4(b), respectively, and coils RLC1-RLC4, respectively, correspond to the pilot relays 252-258, respectively, of FIG. 10. The master relay comprising contacts RLM and coil RLCM correspond to master relay 250 of FIG. 10. Master relay coil RLCM is coupled via relay driver circuit 62 to output port R8 of microprocessor 272. Diode 270 corresponds to diode means 262 of FIG. 10.

CONTROL PROGRAM

The control program which is permanently configured in the ROM of microprocessor 272 to enable the microprocessor to perform the desired control functions will be described with reference to the flow diagrams of FIGS. 12-20. These routines act on information stored in the Random Access Memory (RAM) of microprocessor 272 which is arranged in four files. One file is associated with each heating unit. A register designated the X register is used to address the desired one of the four files. The control program is executed once during each control interval for each heating element sequentially repeating the control routines using the RAM files successively. As hereinbefore described, the switching sequence for each heating element and consequently each pass through the control program requires two cycles of the voltage signal from the power supply. During each pass through the control program the control functions are performed in the following general sequence. During the first positive half-cycle, the master relay is either opened or left undisturbed as required to carry out the switching decision made during the preceding pass through the program for the particular heating element during the preceding control interval. The power level selection means is then scanned to determine the selected power setting. Next, the program pauses to await the next occurring negative half-cycle of the 60 Hz voltage signal. During that negative half-cycle, the pilot relay for the heating element is either opened, closed or left undisturbed as required to carry out the switching decision made during the previous control interval. The program then pauses to await the next occurring positive half-cycle. During that positive half-cycle, the master relay is either closed or left undisturbed in accordance with the previous switching decision. Finally, during the next occurring negative half-cycle of the voltage signal, the switching decision to be implemented for the next control interval, in accordance with the power setting selected, is made. The program then awaits the next occurring positive half-cycle to repeat the control program for the RAM file of the next heating element. Thus, control decisions are made by the control program for a particular heating element to be implemented during the next pass through the program for that heating element.

It should be understood that in addition to the control functions hereinafter described, there may be other control functions to be performed in conjunction with other operating characteristics of the appliance. Instructions for carrying out the routines described may be interleaved with instructions and routines for such other control functions. A more detailed description of the control program of the illustrative embodiment with reference to the flow diagrams follows.

START ROUTINE—FIG. 12

The function of this routine is to call up the appropriate RAM file to be used, that is the file associated with the immediate heating element for which the control program is currently being executed, and to initiate the switching sequence by opening the master relay if necessary to carry out the switching decision made during the preceding control interval for the immediate heating element. A counter designated the SU counter which functions as a four count ring counter is used to call up the RAM files sequentially such that each RAM file is called up every fourth pass through the Control Program.

It will be recalled that the switching sequence begins by opening the master relay during a positive half-cycle of the voltage signal across L1 and L2 when diode 270 is forward biased. To this end, Inquiries 282 and 284 delay the program until the beginning of the next occurring positive half-cycle (signified by K8=1). Block 286 increments the SU counter in all four files, X=0, 1, 2, 3. Inquiry 288, 290 and 292 determine the SU count and call up the appropriate one of RAM files 0, 1, 2 and 3 via Blocks 294, 296, 298 and 300 for SU equal to 1, 2, 3 and 4, respectively. Block 302 resets the SU counter to zero when SU equals 4.

Figure 13:
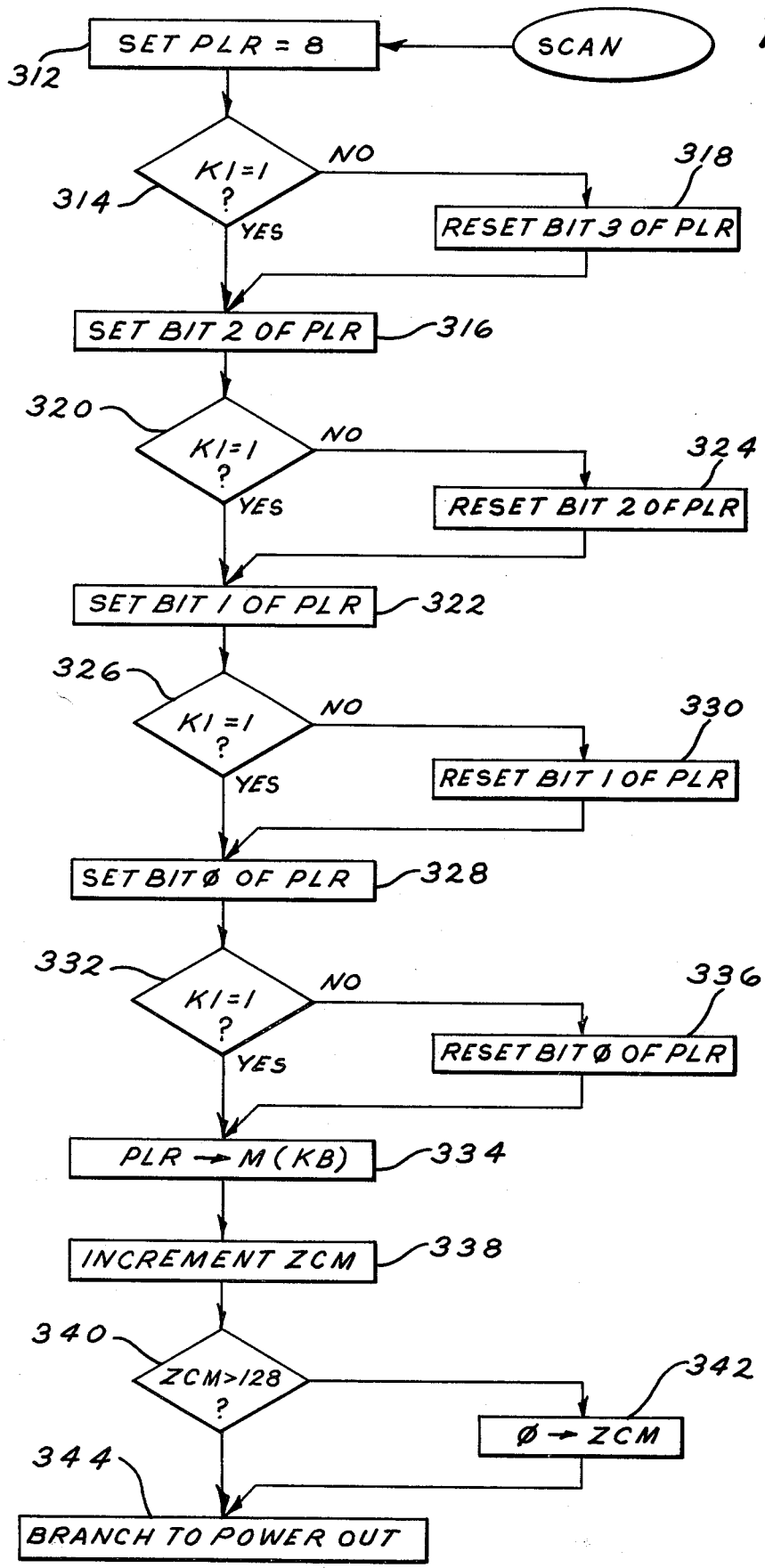
FIG. 13 is a flow diagram of the Scan Routine incorporated in the control program for the microprocessor in the circuit of FIG. 11.

After the appropriate RAM file is selected, Inquiry 306 checks the state of the Power Out Change Latch (POC) for the immediate heating element as established during the previous control interval for the immediate heating element or by the Zipper Control Routine during the immediately preceding execution of the control program, as will be described with reference to the Zipper Control Routine (FIG. 20) hereinafter. As will be described hereinafter with respect to the Change routine (FIG. 19), POC=1 signifies that the control decision being implemented is a change from that implemented during the previous control interval requiring that the associated pilot relay must be changed either from open to closed or closed to open. As the first step in the sequence, the master relay must be opened. Thus, for POC=1 output port R8 which controls the master relay is reset (Block 308), thereby opening the master relay. The program then branches (Block 310) to the Scan Routine (FIG. 13). If POC=0, Inquiry 312 checks the state of a bit or latch designated POS. As will be described in greater detail with reference to the Zip Control Routine (FIG. 20), POS=0 signifies that the power setting for all heating elements is the OFF setting. Under such conditions, it is desirable to maintain the Master Relay in its open state. To this end, when POS=0, output port R8 is reset (Block 308) and the program branches (Block 310) to the Scan Routine (FIG. 13). If POC=0 and POS=1, this signifies that no switching of the pilot relay for the immediate heating element is required and at least one heating unit is operating at a Non-OFF power level. No change is made to the state of R8 and the program branches (Block 310) to the Scan Routine (FIG. 13).

SCAN ROUTINE—FIG. 13

Figure 4:
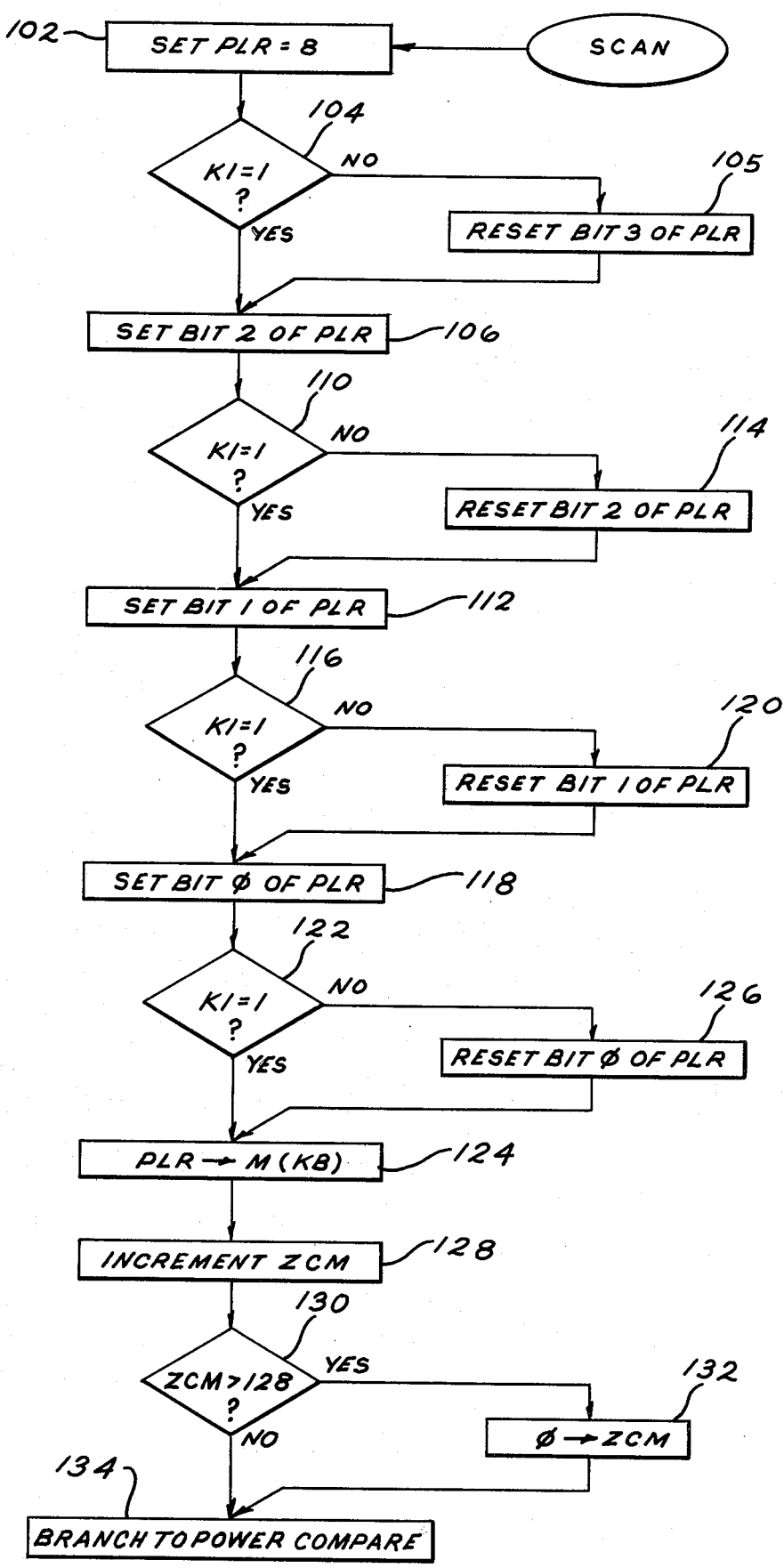
FIG. 4 is a flow diagram of the Scan Routine incorporated in the control program for the microprocessor in the circuit of FIG. 3.
Figure 5:
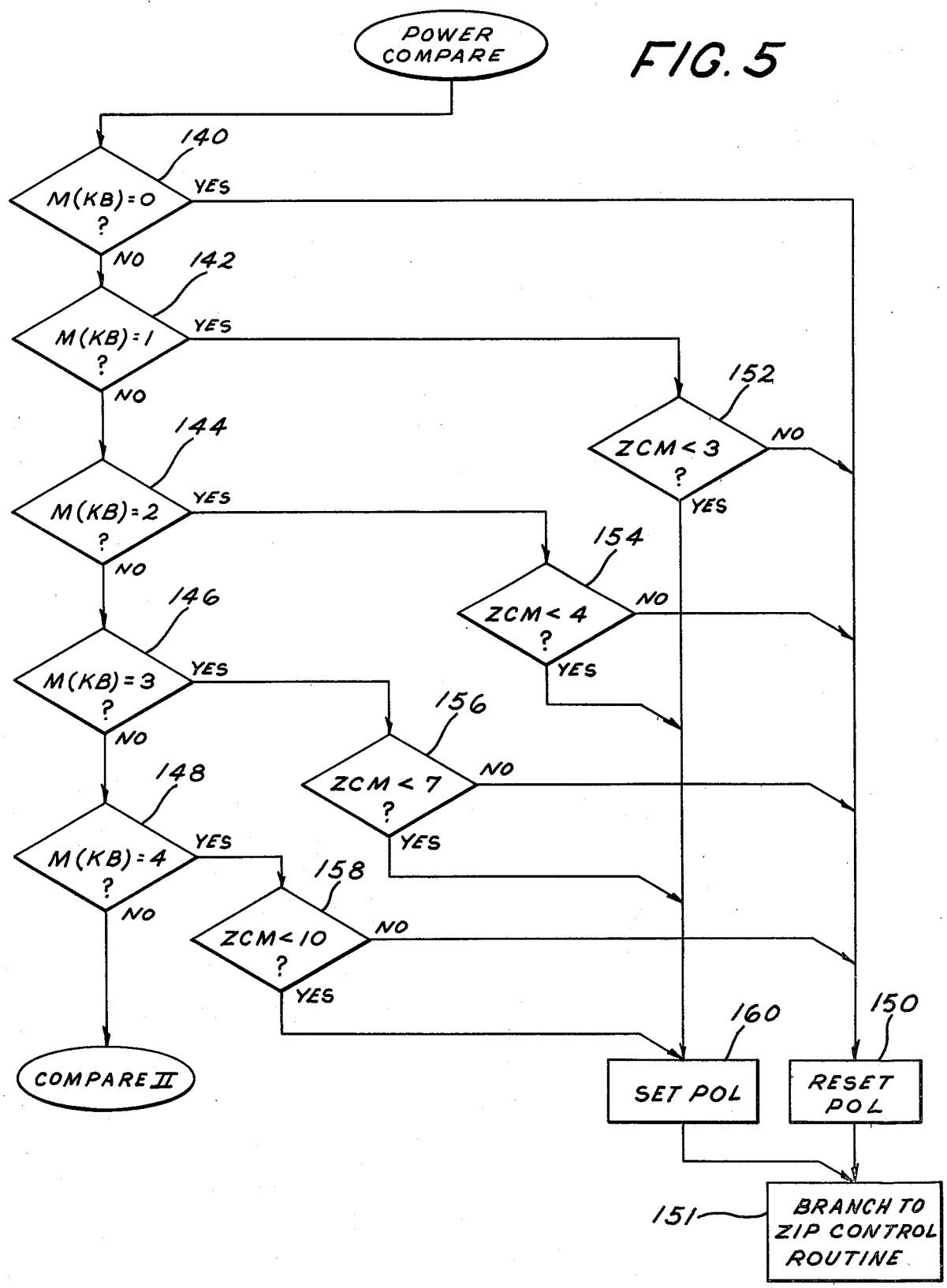
Figure 6:
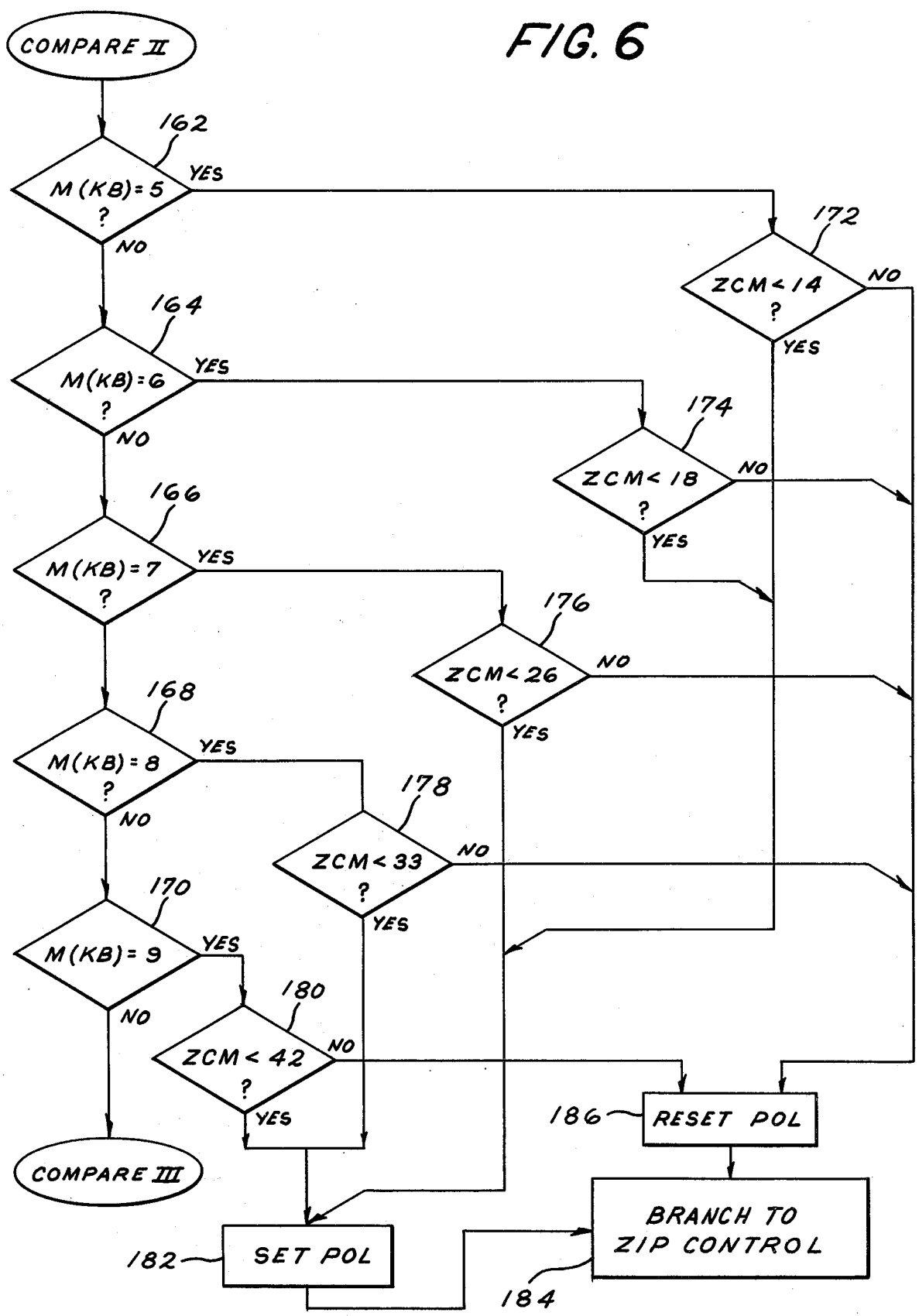
Figure 14:
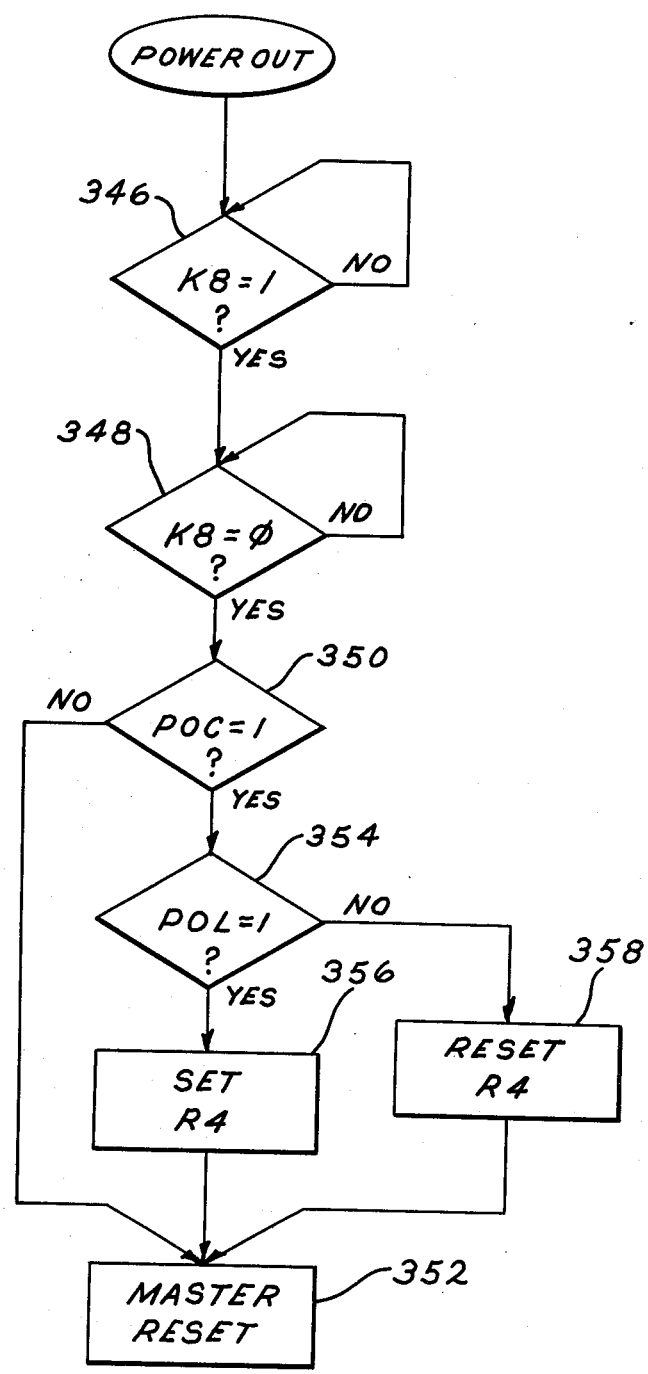
FIG. 14 is a flow diagram of the Power Out Routine incorporated in the control program for the microprocessor in the circuit of FIG. 11.

This Scan Routine is essentially the same as that of FIG. 4 with Blocks 312-342 performing in the same manner as their counterparts, Blocks 102-132, of FIG. 4, the only difference being that upon completion of the routine of FIG. 13 the program branches (Block 344) to the Power Out Routine (FIG. 14).

POWER OUT ROUTINE—FIG. 14

The function of this routine is to carry out step two of the switching sequence by establishing the proper state of the output port R(n) (n=4-7 for relays RL1-RL4, respectively) for the immediate heating element n so as to carry out the control decision of the preceding control interval for that element during the next occurring negative half-cycle of the voltage signal across L1 and L2.

Figures 15, 19:
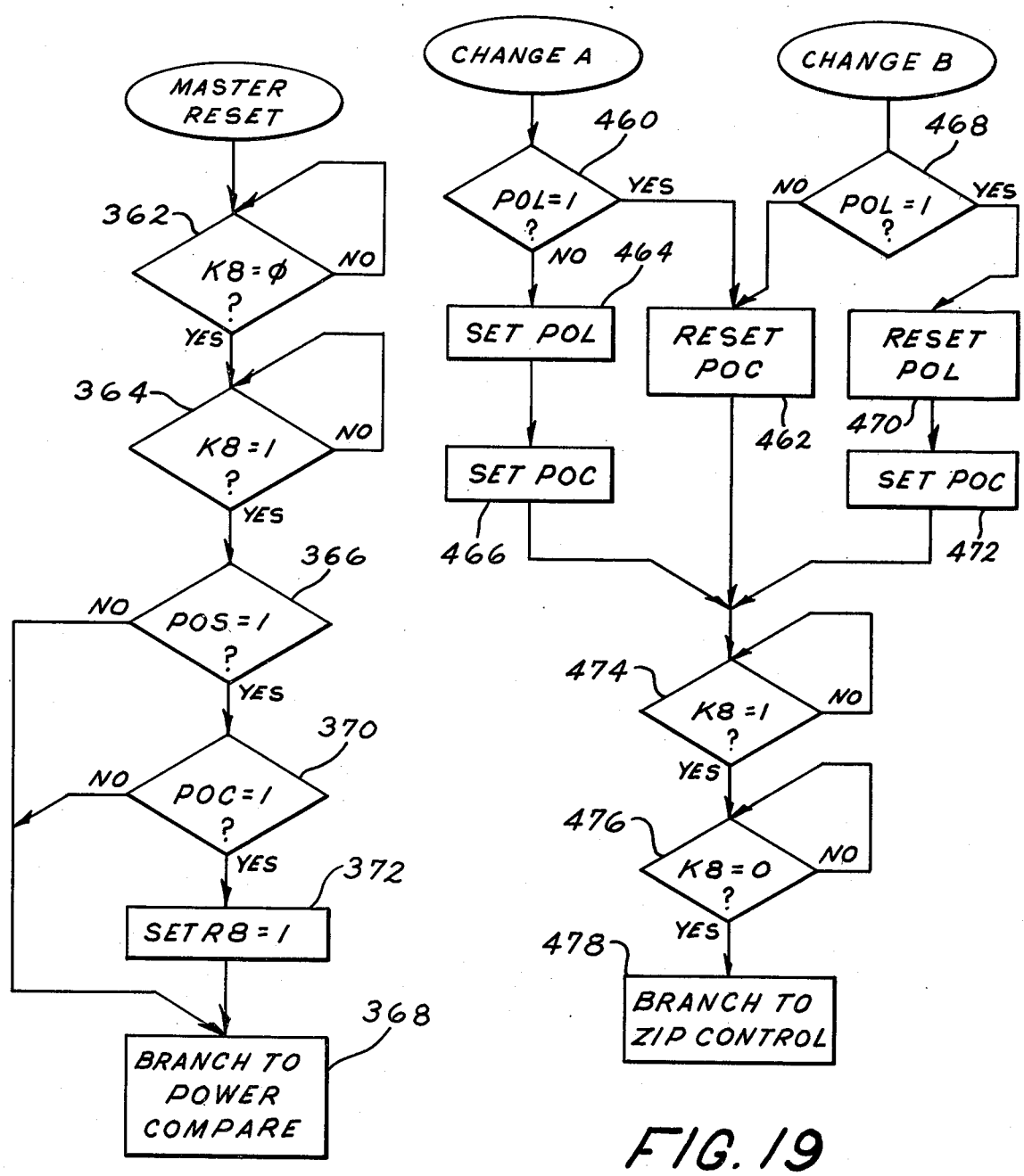
FIG. 15 is a flow diagram of the Master Reset Routine incorporated in the control program for the microprocessor in the circuit of FIG. 11.
FIG. 19 is a flow diagram of the Change Routine incorporated in the control program for the microprocessor in the circuit of FIG. 11.

Inquiries 346 and 348 synchronize the program, awaiting the next occurring negative half-cycle of the voltage signal. Inquiry 350 determines the state of POC established during the preceding control interval for the immediate heating element. POC=0 signifies no change from the previous control interval, in which case the state of the output port R(n) is undisturbed and the program branches (Block 352) to the Master Reset Routine (FIG. 15).

If POC=1, signifying a change, Inquiry 354 checks the state of POL to determine whether the change is from Closed to Open (POL=0) or Open to Closed (POL=1). If POL=1, the corresponding output port R(n) is set (Block 356) thereby closing the associated pilot relay. If POL=0, the corresponding output port R(n) is reset (Block 358), thereby opening the associated pilot relay. The program then branches (Block 352) to the Master Reset Routine (FIG. 15).

MASTER RESET ROUTINE—FIG. 15

The function of this routine is to carry out the third step of the switching sequence by closing the master relay during the next positive half-cycle, if necessary, to complete the switching sequence, if any, initiated to carry out the switching decision from the preceding control interval.

Figure 16:
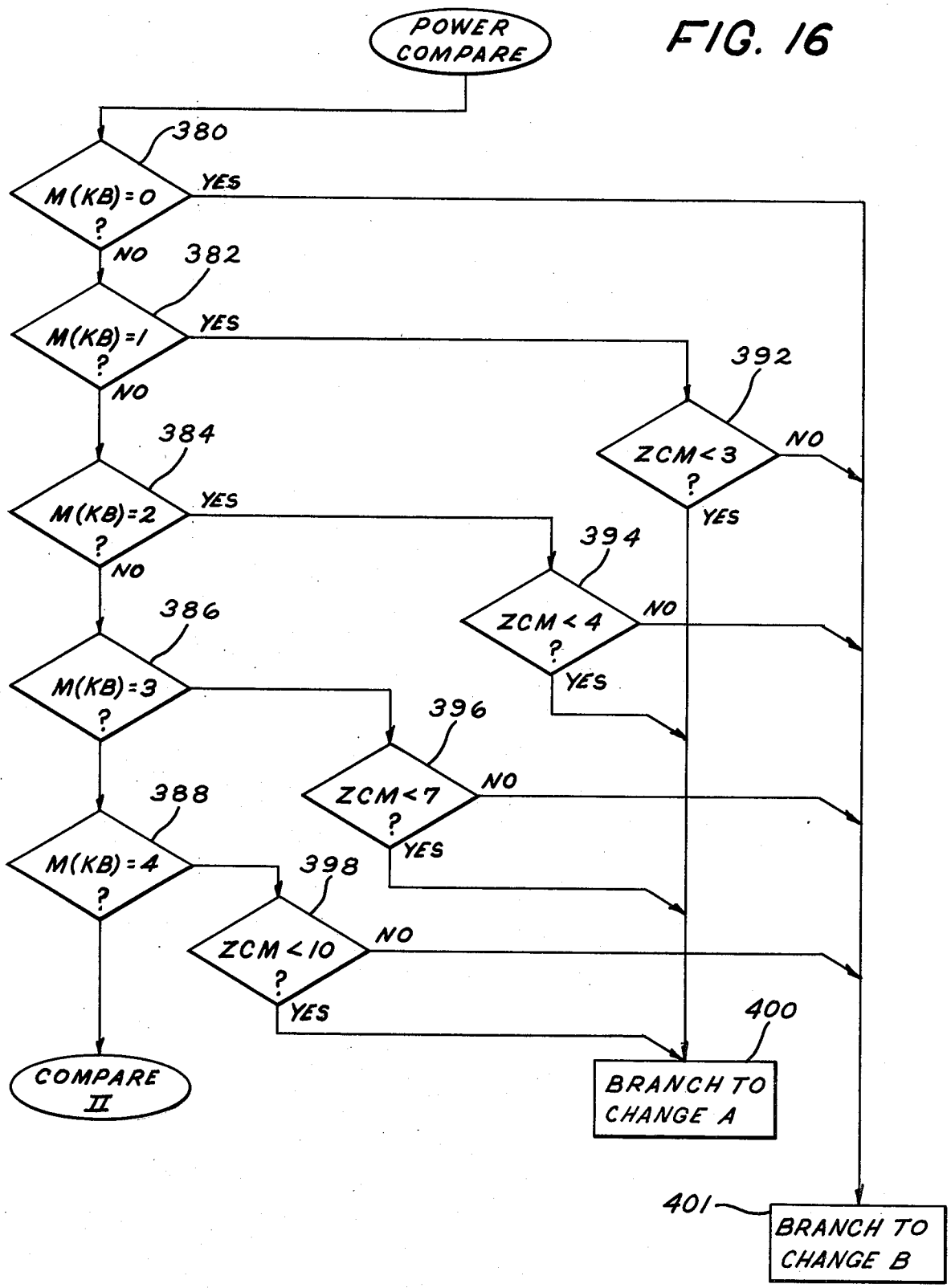
FIGS. 16–18 are flow diagrams of the Power Compare Routine incorporated in the control program for the microprocessor in the circuit of FIG. 11.
Figure 17:
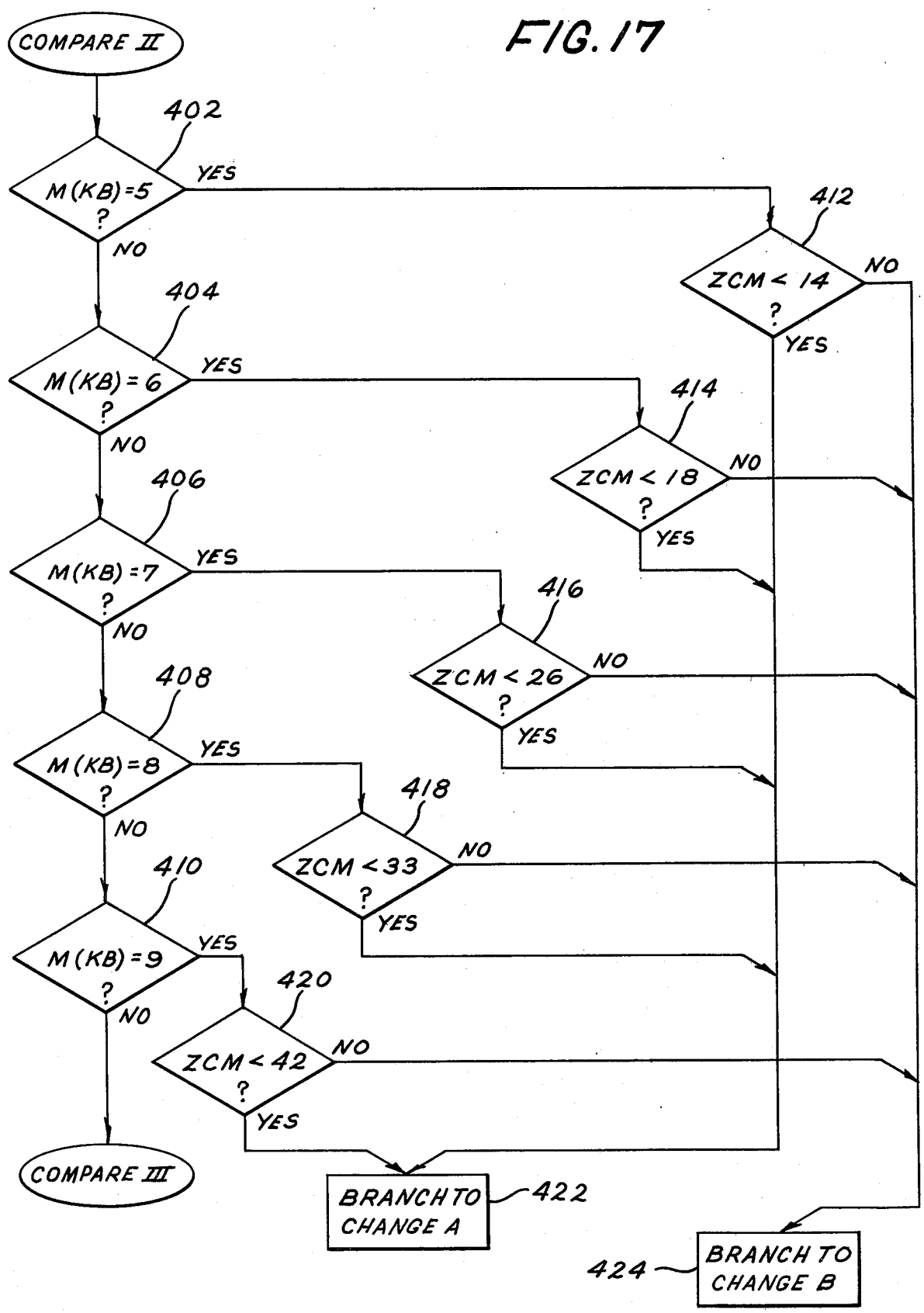

Inquiries 362 and 364 delay the program until the next occurring positive half-cycle of the voltage signal. The state of POS is checked by Inquiry 366 to determine whether the operator-selected power settings for any of the heating units is a non-OFF power setting. If not, (POS=0), the master relay which was reset during the first step of the sequence (See Blocks 308 and 312, FIG. 12) remains reset and the program branches (Block 368) to the Power Compare Routine (FIG. 16). If POS=1, Inquiry 370 checks the state of POC. If POC=0, there was no change required, and the state of R8 is undisturbed and the program branches (Block 308) to the Power Compare Routine (FIG. 16). If POC=1, a change was required, causing R8 to be reset during the first step of the switching sequence. R8 is set (Block 372) thereby closing the master relay and the program branches (Block 368) to the Power Compare Routine (FIG. 16).

POWER COMPARE ROUTINE—FIGS. 16-18

This routine performs the primary power control function, namely, to determine during each control interval whether or not the heating element is to be energized during the next control interval. As in the Power Compare Routine of FIGS. 5-7, this is done by comparing the count of the Master Counter (ZCM) to a number corresponding to the number of control intervals for which the heating element is energized per control period for the power setting selected. However, rather than setting or resetting POL in this routine, the program causes a branch either to entry point CHANGE A or CHANGE B of the CHANGE Routine (FIG. 19). As will become apparent from the description of the CHANGE Routine, entry at CHANGE A causes the POL to be set, and entry at CHANGE B causes the POL to be reset. Thus, a decision to energize or not to energize the heating element is carried out by branching to entry point CHANGE A or CHANGE B, respectively.

For M(KB) representing the OFF power setting (Yes to Inquiry 380) no comparison is necessary, and the program branches (Block 401) to the CHANGE Routine, FIG. 19, at entry point CHANGE B. For M(KB) representing one of power settings 1-4 (Yes to one of Inquiries 382-388), the ZCM count is compared to reference counts 3, 4, 7 and 10 (Inquiries 392-398) respectively. If the power level selected is one of these levels 1-4 and the ZCM count is less than the reference corresponding to that power level, the heating element will be energized during the next control interval. To this end the program branches (Block 400) to the CHANGE Routine, FIG. 19 at entry point CHANGE A. If the ZCM is not less than the corresponding reference value of the selected power level, the element will not be energized. To this end, the program branches (Block 401) to entry point CHANGE B of the CHANGE Routine, FIG. 19.

If the selected power level is not one of levels 1-4 the program continues (FIG. 17) at entry point Compare II. Inquiries 402-410 determine whether the selected power level is one of levels 5-9, respectively. The corresponding reference values for these power levels are 14, 18, 26, 33 and 42, respectively. If the selected power level is one of levels 5-9 and the ZCM count is less than the corresponding reference value as determined by Inquiries 412-420, respectively, the heating element will be energized during the next control interval. The program branches (Block 422) to CHANGE A of the CHANGE Routine (FIG. 19). If one of these power levels is selected but the count is greater than the corresponding reference value, the heating element will not be energized during the ensuing control interval. The program branches (Block 424) to CHANGE B of the CHANGE Routine (FIG. 19).

Figure 18:
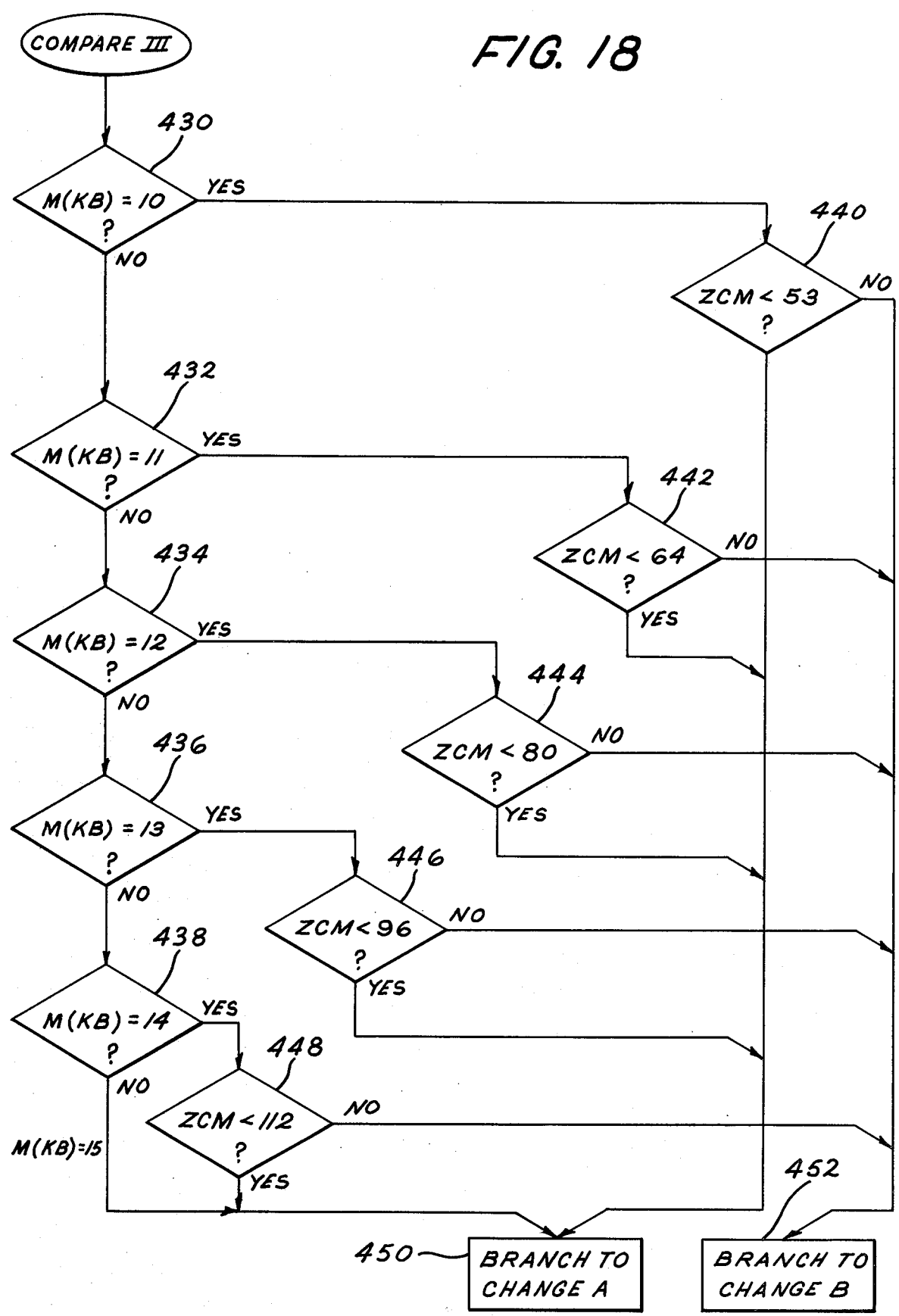

If the selected power level is not one of levels OFF-9, the program continues at Compare III (FIG. 18). Inquiries 430-438 determine whether power levels 10-14 have been selected, respectively. The reference values associated with these power levels are 53, 64, 80, 96 and 112, respectively. If the ZCM count is less than the reference value corresponding to the selected power level, as determined by Inquiries 440-448, respectively, the heating element will be energized during the ensuing control interval. The program branches (Block 450) to CHANGE A of the CHANGE Routine (FIG. 19). If one of these levels is selected but the ZCM count is greater than the reference value, the program branches (Block 452) to CHANGE B of the CHANGE Routine, FIG. 19. Finally, if the answer to Inquiry 438 is No, the selection must represent power level 15, which is the maximum power level for which the heating element is energized for every control interval. Thus, the program branches (Block 450) to CHANGE A of the CHANGE Routine, FIG. 19.

CHANGE ROUTINE—FIG. 19

The function of this routine is to compare the present power control decision from the Power Compare Routine with the old power control decision from the preceding control interval for the immediate heating element to determine whether or not the present decision represents a change from the preceding decision and to establish the state of POC and POL accordingly.

It will be recalled that a decision to energize the heating element during the next control interval is signified by entry to this routine at CHANGE A. Inquiry 460 checks the state of the POL, which at this point still represents the state established during the preceding control interval. If POL=1, this signifies that POL was set during the preceding interval. Since entry at CHANGE A indicates that POL is also to be set during the present interval, the present control decision requires no change of state for the relay controlling the immediate heating element. Thus, POC is reset (Block 462). POL=0, signifying that the previous decision was to deenergize the heating element; thus, the present power control decision to be implemented during the next control interval is a change from a deenergized state to an energized state. The POL is set (Block 464) and the POC is set (Block 466).

If the routine is entered at CHANGE B, signifying a power control decision not to energize the immediate heating element during the next control interval, Inquiry 468 checks the state of the POL (from the preceding control interval). POL=1, signifies that the old decision was to deenergize the heating element; thus, the present decision represents a change from energized to deenergized. The POL is reset (Block 470) and the POC is set (Block 472). If POL=0, the new power control decision is the same as the preceding decision. POC is reset (Block 462), leaving POL reset from the preceding control interval.

Figure 20:
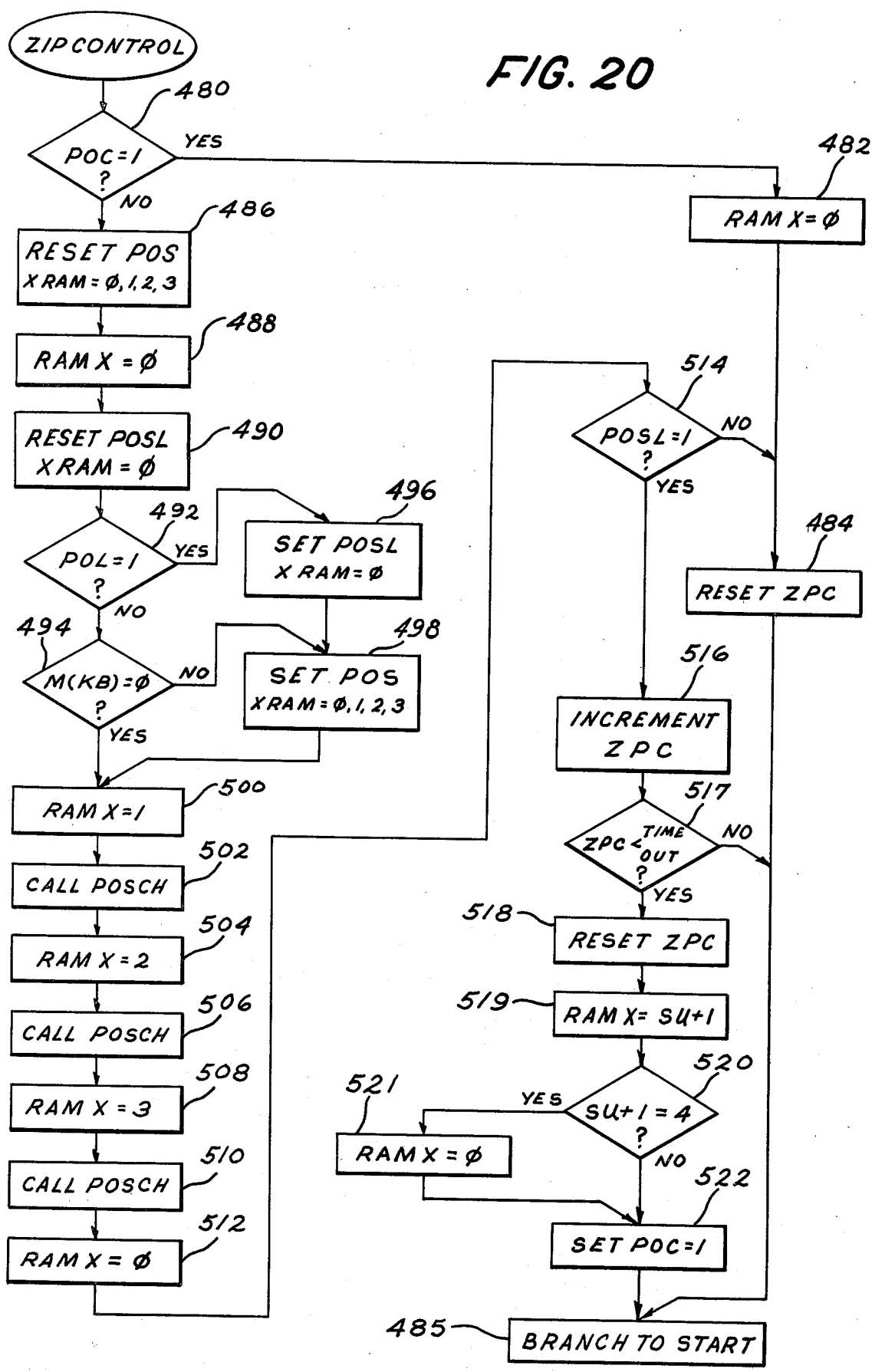
FIG. 20 is a flow diagram of the Zip Control Routine incorporated in the control program for the microprocessor in the circuit of FIG. 11.

Inquiries 474 and 476 delay the program until the beginning of the next occurring negative half-cycle at which time the program branches (Block 478) to the Zip Control Routine (FIG. 20).

ZIP CONTROL ROUTINE—FIG. 20

This routine performs the Zipper Control Counter (ZPC) function and causes the master relay to be opened, thereby interrupting power to all heating elements for a predetermined period, namely, the next positive half-cycle of the 60 Hz voltage signal, notwithstanding the power control decision, if the time between power control interrupts exceeds a predetermined maximum time corresponding to a predetermined maximum count.

The ZPC implemented in this routine is a single counter common to all surface units, which is stored in RAM file X=0.

POS and POSL are latches employed in this routine. POS is used for power control purposes. Its function is to insure that if the OFF power setting has been selected for all four surface units, the master relay is opened. The state of the latch is controlled in this routine, but the information it conveys is used in the START routine hereinbefore described with reference to FIG. 12. A POS latch is provided in the RAM file for each heating element. POSL is used in performing the zipper protection function. POSL is used to signify whether any of the POL's are set. Only one POSL is provided which is located in RAM file X=0.

Referring now to FIG. 20, Inquiry 480 determines whether there has been a Power Out Change for the immediate heating element. If the present control decision differs from the preceding control decision for that heating element, POC=1. If POC=1, then the master relay will be opened for the first positive half-cycle of the next control interval for that heating element as the first step in the regular power control switching sequence. Thus, power will be interrupted for a period of one-half cycle of the 60 Hz voltage signal for all four heating elements, and ZPC needs to be reset. To this end, RAM file X=0 is called (Block 482), and the ZPC is reset (Block 484). The program then returns (Block 485) to START (FIG. 12) to repeat the control program for the next heating element.

If POC=0, the new control decision for the immediate relay is the same as the preceding control decision. Thus, it is possible to be in a mode where a zipper can occur, and it is necessary to check the Power Out Latches (POL's) for each of the heating elements to determine whether at least one of the elements is being energized. If the POL is zero for all of the heating elements, then none of the heating elements is energized, in which case power is interrupted for four heating elements and the ZPC is to be reset. However, if at least one heating element is being energized and POC is zero for the immediate surface unit, then it is possible to be in a mode where a zipper can occur, in which case the ZPC counter is to be incremented and the count compared with the maximum count to determine whether the predetermined maximum time between interrupts has been exceeded.

If POC=0, as determined by Inquiry 480, POS is reset in each RAM file (Block 486); RAM file X=0 is called (Block 488) and POSL is reset (Block 490).

Next, a check of the POL in each RAM is initiated by a subroutine designated POSCH comprising Inquiries 492 and 494 and Blocks 496 and 498. First, the RAM file X=0 is being acted upon. The state of the POL for that file is checked (Inquiry 492); if the POL is set (POL=1), POSL is set (Block 496) and the POS in all four RAM files is set (Block 498). If the POL in RAM file X=0 is not set (POL=0), Inquiry 494 determines whether the OFF power setting is selected for the heating element associated with RAM file X=0. If No, (M(KB)=1), POS in all four RAM files is set (Block 498), and the program continues to Block 500. If Yes, (M(KB)=0), then the program proceeds to Block 500.

Blocks 500-510 check the POL's for the remaining three heating units and set the POSL and POS latches appropriately by sequentially repeating the POSCH subroutine on the remaining three RAM files X=1, 2 and 3. In this way if any of the POL's are set, POSL will be set in RAM file X=0. Also, if any of the POL's are set or if any of the heating units are operating in response to a non-OFF power setting, POS will be set in all four RAM files.

Block 512 calls RAM file X=0 to check the POSL and to take appropriate action with respect to the ZPC which is also located in that RAM file.

Figure 12:
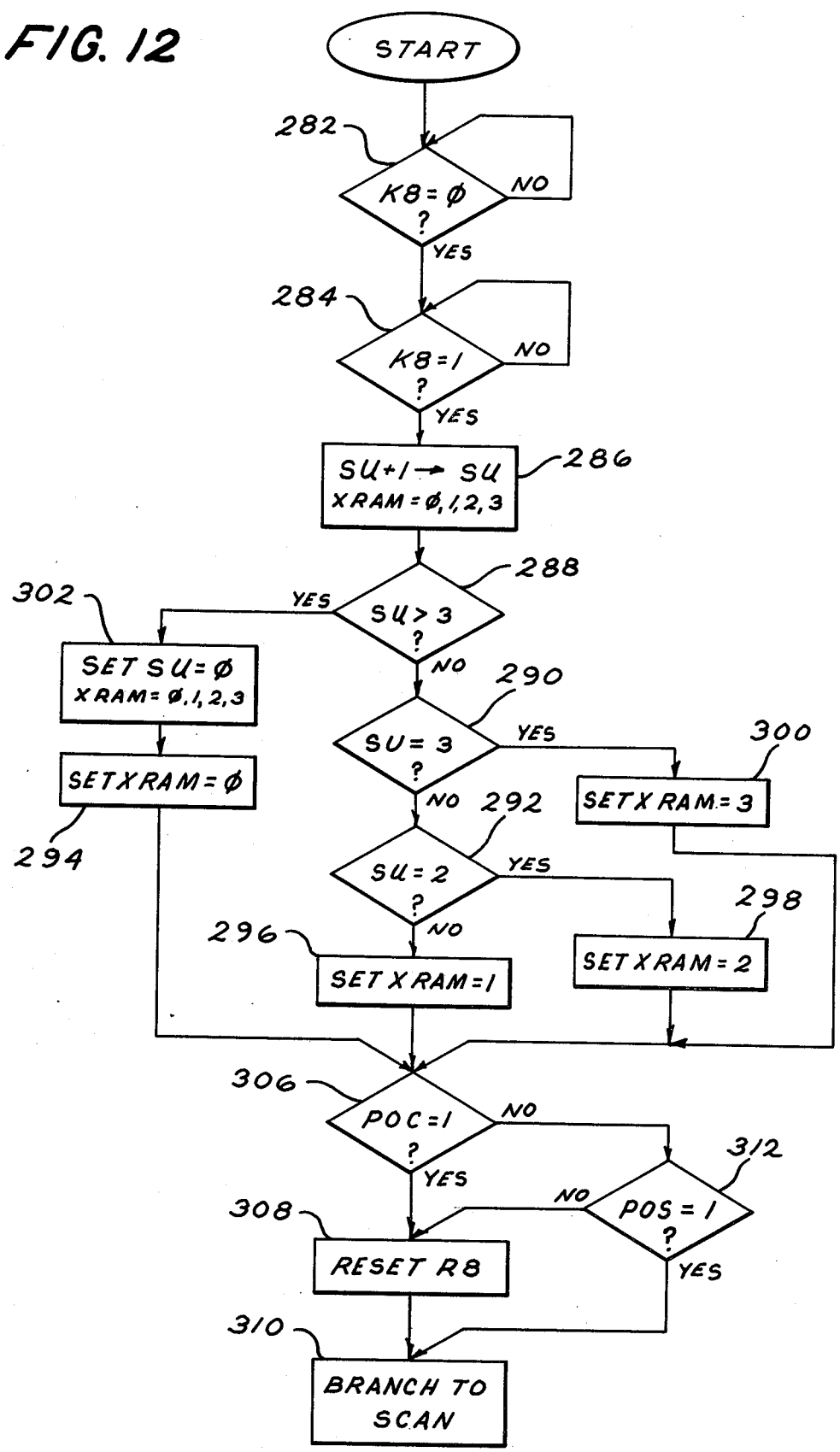
FIG. 12 is a flow diagram of the Start Routine incorporated in the control program for the microprocessor in the circuit of FIG. 11.

The state of POSL is determined by Inquiry 514. If POSL=0, indicating that none of the Power Out Latches are set, the ZPC is reset (Block 484), and the program returns (Block 485) to START (FIG. 12).

If POSL=1, the ZPC is incremented (Block 516). Inquiry 518 then determines whether the ZPC has counted a predetermined maximum count designated TIME OUT. Since the ZPC is potentially incremented each pass through this routine, i.e., every two voltage signal cycles, the ZPC in this embodiment, in effect, counts voltage signal cycles by being incremented at a maximum rate of one count per two 60 Hz voltage signal cycles. The TIME OUT value is set at 512 corresponding to 1024 voltage cycles, which is the duration of the duty cycle control period. This corresponds to a time period of approximately 17 seconds. Thus, whenever the count exceeds 512, indicating that the master relay has remained closed for 1024 cycles, it is necessary to interrupt power to the heating units for zipper control purposes. If the answer to Inquiry 516 is No, the program returns (Block 485) to START; if Yes, the ZPC is reset (Block 518); the RAM file for the heating element for which the control program will be next executed, X=(SU+1) or X=0 if SU+1=4, is called (Blocks 519, 520 and 521) and the POC is set (Block 522) for that RAM file. The program then returns (Block 485) to START, FIG. 12, to repeat the program for the next heating element.

By setting the POC for the next heating element whenever ZPC times out, power will be interrupted during the next occurring positive half-cycle of the 60 Hz voltage signal by execution of the START routine for the next heating element. It will be apparent that the POC for any of the RAM files, including RAM X=0, which is the same file containing the ZPC counter, could have been picked to be set equal to one. In this illustrative embodiment, the POC for the next heating element to be controlled was selected because that choice provided the earliest opportunity to interrupt the power.

The illustrative embodiments of the protective control arrangements described hereinbefore have incorporated four heating elements. However, as will be apparent to those skilled in the art a greater or lesser number could be similarly controlled.

While in accordance with the Patent Statutes specific illustrative embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A protective control arrangement for a heating unit of the type comprising the concentric assembly of a resistive heating element embedded in an insulating material and enclosed within a metallic sheath, the insulating material in its normal state being characterized by a very high resistance and in its combined molten and plasma state being characterized by a relatively low resistance, the resistive element being adapted for energization by an external power supply, the heating unit being susceptible to a discontinuity developing in the resistive element when energized which can result in an electrical arc at the discontinuity, the arc being effective to reduce the insulating material proximate to the arc to its relatively low resistance molten and plasma state to create a relatively low resistance current path from the discontinuity to the sheath and ultimately rupture the sheath; the arc and rupture if unchecked propagating along the length of the sheath, the period of propagation being the time between initiation and termination of such propagation, the insulating material having associated therewith a nominal recovery time required to allow the resultant relatively low resistance molten and plasma insulating material to return to a relatively high resistance state upon extinguishing the arc by interruption of power to the heating element, said protective control arrangement comprising:

power level selection means for enabling the user to select a power setting for the heating unit from a plurality of available power settings;

switch means adapted to be operatively connected to the heating element for selectively coupling the heating element to the external power supply;

control means responsive to said power level selecting means and operative to control the duty cycle of the heating element for at least one of said power settings by periodically opening said switch means to decouple the heating element from the power supply for idle periods of predetermined duration, the duration of said idle periods and the period between said idle periods depending upon the power level selected by the user; and timing means operative to monitor the time between decouplings, which time depends upon the power level selected by the user; said timing means being reset by said control means in response to the occurrence of each power control decoupling;

said control means being responsive to said timing means and further operative to interrupt power to the heating element for a recovery period of predetermined duration whenever the time between decouplings exceeds a predetermined maximum time, said predetermined maximum time being selected to confine the duration of the period of propagation within predetermined limits, said recover period being at least equal to the nominal recovery time; whereby the propagation of a relatively low resistance current path from the heating element to the metallic sheath through the insulating material along a substantial portion of the length of the heating unit resulting from the occurrence of a discontinuity in the heating element is prevented.

2. A protective control arrangement according to claim 1 wherein said predetermined maximum time at least equals the time between terminations of successive one of said idle periods.

3. A protective control arrangement according to claim 1 wherein said period between successive ones of said interrupt periods is not substantially greater than approximately 17 seconds.

4. A protective control arrangement according to claims 1 or 2 or 3 wherein the druation of each said interrupt period is at least 8 milliseconds.

5. A protective control arrangement for a heating unit of the type comprising the concentric assembly of a resistive heating element embedded in an insulating material and enclosed within a metallic sheath, the insulating material in its normal state being characterized by a very high resistance and in its molten state being characterized by a relatively low resistance the resistive element being adapted for energization by an external power supply, the heating unit being susceptible to a discontinuity developing in the resistive element when energized which can result in an electrical arc at the discontinuity, such arc being effective to reduce the insulating material proximate the arc to its relatively low resistance molten and plasma state, thereby providing a relatively low resistance current path from the discontinuity to the sheath ultimately rupturing the sheath, the rupture if unchecked then propagating along the length of the heating unit, the heating unit having associated therewith a nominal propagation time required for the rupture to propagate along a substantial portion of the length of the heating unit; the insulating material having associated therewith a nominal recovery time required to allow the resultant relatively low resistance molten insulating material to return to a relatively high resistance hardened state upon extinguishing the arc by interruption of power to the heating element, said control arrangement comprising:
   switch means adapted to be operatively connected to the heating element for selectively coupling the heating element to the external power supply; and
   control means operative to control the duty cycle of the heating element in accordance with the user selected power setting by periodically opening said switch means for idle periods of predetermined duration, thereby decoupling the heating element from the power supply, the duration of and time between idle periods depending upon the selected power setting;
   counter means operative to repetitively count a predetermined number of cycles of the voltage signal from the external power supply and reset, said predetermined number corresponding to a predetermined time period less than the nominal propagation time;
   said control means being effective to reset said counter means in response to each opening of said switch means, the time between said openings depending upon the selected power setting;
   said control means being responsive to said counter means and effective to interrupt power to the heating element for a predetermined recovery period whenever said counter means counts said predetermined number of cycles, the duration of each of said interrupt periods being at least approximately equal to the nominal recovery time for the insulating material, whereby the propagation of a rupture in the sheath along the length of the heating unit resulting from the occurrence of a discontinuity in the heating element is prevented.

6. A protective control arrangement according to claim 5 wherein said predetermined number corresponds to a time period between successive ones of said interrupt periods is not substantially greater than approximately 17 seconds.

7. A protective control arrangement according to claims 5 or 6 wherein the duration of each of said recovery periods is at least 8 milliseconds.

8. A protective control arrangement for an appliance employing a plurality of heating units, each heating unit being of the type comprising the concentric assembly of a resistive heating element embedded in an insulating material and enclosed within a metallic sheath, the insulating material in its normal state being characterized by a very high resistance and in its molten and plasma state being characterized by a relatively low resistance, the resistive element being adapted for energization by a voltage signal from an external alternating current power supply, the heating unit being susceptible to a discontinuity developing in the resistive element when energized which can result in an electrical arc at the discontinuity, the arc being effective to reduce the insulating material proximate to the arc to its relatively low resistance molten and plasma state to create a relatively low resistance current path from the discontinuity to the sheath and ultimately rupture the sheath, the arc and rupture if unchecked propagating along the length of the sheath, the period of propagation being the time between initiation and termination of such propagation, the insulating material having associated therewith a nominal recovery time required to allow the resultant relatively low resistance molten and plasma insulating material to return to a relatively high resistance state upon extinguishing the arc by interruption of power to the heating element, said control arrangement comprising:
   a plurality of sheathed heating units, each comprising the concentric assembly of a metallic sheath, insulating material within said sheath and a resistive heating element embedded in said insulating material;
   power level selection means for enabling the operator to select one of a plurality of power settings for each of said heating units;
   a plurality of pilot relays, each being connected in electrical series with an associated one of said plurality of heating elements; to form a plurality of pilot relay and heating element combinations;
   each of said pilot relay and heating element combinations being electrically connected in parallel with each of said other relay and heating element combinations, thereby forming a parallel array of such combinations;
   a master relay serially operatively coupled to said parallel array effective to couple said parallel array to the external power supply;
   a commutating diode coupled in parallel with said master relay;
   control means for controlling the switching of said master and pilot relays in response to said power settings selected by the operator for each of said heating units;
   said control means being operative to switch said pilot relays in synchronization with the voltage signal from the external power supply by performing said switching in the following sequence:

(a) said master relay is opened during a first half-cycle of the voltage signal during which said commutating diode is forward biased;

(b) the state of said pilot relay is changed during the next occurring half-cycle of the voltage signal; and (c) said master relay contact is closed during the third successive half-cycle of said power signal;

counter means operative to repetitively count a predetermined number of cycles of the voltage signal from the external power supply and reset;

said control means including means responsive to said counter means operative to open said master relay means for a recovery period of predetermined duration whenever said counter means counts said predetermined number of cycles, said predetermined number of cycles being selected to confine the duration of the period of propagation within predetermined limits;

said counter means being arranged to reset regardless of its count in response to said control means whenever said master relay is opened, the time between openings of said master relay being a function of the power settings selected for said heating elements, thereby preventing the propagation of a relatively low resistance current path from the heating element to the metallic sheath of the heating unit through the molten insulating material along a substantial portion of the length of the heating unit resulting from the occurrence of a discontinuity in the heating element.

9. The protective arrangement according to claim 8 wherein said control means is operative to independently control the duty cycle of each one of said heating elements for at least one of said power settings by periodically decoupling the heating element from the power supply for idle periods of predetermined duration by opening the associated one of said pilot relays for idle periods of predetermined duration, the duration of said idle periods depending upon the power level selected by the operator; and wherein said predetermined number of cycles at least equals the number of cycles between the termination of successive ones of said idle periods.

10. The protective control arrangement according to claim 8 wherein said predetermined number of cycles is selected such that the period between successive openings of said master relays is not substantially greater than 17 seconds.

11. The protective control arrangement according to claim 8 wherein the external power supply is a 60 Hz alternating current supply and wherein the predetermined number of cycles is 1024.

12. A protective method for sheathed resistance heating units of the type having associated therewith a nominal breakdown time required for an arc created by a discontinuity in the heating element to create a relatively low resistance current path from the discontinuity to the sheath employed in an apparatus of the type in which power control is accomplished by periodically decoupling the heating unit from the power supply, the period between decouplings being determined according to the power level setting selected by the operator from a plurality of available power settings, the method comprising the steps of:

monitoring the time duration of the period between successive power control decouplings for each heating unit, which duration varies according to the selected power level setting; and interrupting power to the heating element for a predetermined interrupt period whenever the time between successive power decouplings at least equals the predetermined breakdown time, the interrupt period being of sufficient duration to extinguish the arc and restor a high resistance between the discontinuity and the sheath.

13. A protective method for limiting the propagation of a disruption along the length of the sheath resulting from a discontinuity in the heating element for heating units of the type comprising the concentric assembly of a resistive heating element adapted for energization by an external power supply, embedded in an insulating material and enclosed within a metallic sheath adapted for electrical grounding, the insulating material having in its normal state a very high resistance and in its combined molten and plasma state a relatively low resistance, the heating unit being susceptible to a discontinuity developing in the resistive element which can result in an electrical arc at the discontinuity, the arc being effective to reduce the insulating material proximate to the arc to its relatively low resistance molten and plasma state to create a relatively low resistance current path from the discontinuity to the sheath, and ultimately rupture the sheath, the arc and resultant if unchecked propagating along the length of the sheath, the period of propagation being the time between initiation and termination of such propagation, the insulating material having associated therewith a nominal recovery time required to allow the resultant relatively low resistance molten and plasma insulating material to return to a relatively high resistance state following extinguishing of the arc by interruption of power to the heating element, such heating units being in an appliance employing duty cycle power control such that power to the heating element is periodically interrupted for certain power settings, the time between power control interrupting a function of the power level selected, the method comprising the steps of:

timing the period between power control interruptions for each heating element;

resetting the timing upon the occurrence of each power control interruption; and interrupting the application of power to the heating element for an interrupt period of duration at least equal to the nominal recovery time whenever the time between interruptions of power to the heating element equals a predetermined time, the predetermined time being selected to confine the duration of the period of propagation within a predetermined limit.

* * * * *

UNITED STATES PATENT AND TRADEMARK OFFICE
CERTIFICATE OF CORRECTION

PATENT NO. : 4,465,924

DATED : August 14, 1984

INVENTOR(S) : Thomas R. Payne

It is certified that error appears in the above-identified patent and that said Letters Patent is hereby corrected as shown below:

Column 23, line 8, "druation" should read --duration--.

Column 22, line 16, "art" should read --arc--.

Column 26, line 14, "restor" should read --restore--.

Column 26, line 47, insert --being-- after "interrupting".

Signed and Sealed this

Twenty-sixth Day of February 1985

[SEAL]

Attest:

DONALD J. QUIGG

Attesting Officer

Acting Commissioner of Patents and Trademarks